US012753615B2

(12) United States Patent
Li

(10) Patent No.: US 12,753,615 B2
(45) Date of Patent: Oct. 6, 2026

(54) CERAMIC TILE LEVELING BRACKET, PUSHING AND CLAMPING PLIERS, AND CERAMIC TILE LEVELING AND LAYING SYSTEM

(71) Applicants: HANGZHOU UNITED TOOLS CO., LTD, Hangzhou City (CN); HANGZHOU GREAT STAR INDUSTRIAL CO., LTD, Hangzhou City (CN)

(72) Inventor: Yueming Li, Hangzhou City (CN)

(73) Assignees: HANGZHOU UNITED TOOLS CO., LTD, Hangzhou City (CN); HANGZHOU GREAT STAR INDUSTRIAL CO., LTD, Hangzhou City (CN)

( * ) Notice: Subject to any disclaimer, the term of this patent is extended or adjusted under 35 U.S.C. 154(b) by 593 days.

(21) Appl. No.: 18/203,154

(22) Filed: May 30, 2023

(65) Prior Publication Data

US 2023/0304308 A1 Sep. 28, 2023

Related U.S. Application Data

(60) Division of application No. 17/028,820, filed on Sep. 22, 2020, now Pat. No. 11,661,752, which is a (Continued)

(30) Foreign Application Priority Data

Dec. 18, 2016 (CN) ......................... 201621388937.1

(51) Int. Cl.
*E04F 21/22* (2006.01)
*B25B 7/02* (2006.01)
(Continued)

(52) U.S. Cl.
CPC ........... *E04F 21/1877* (2013.01); *B25B 7/02* (2013.01); *B25B 27/02* (2013.01); *E04F 21/0092* (2013.01); *E04F 21/22* (2013.01)

(58) Field of Classification Search
CPC ... E04F 21/0092; E04F 21/22; E04F 21/1877; E04F 13/0892; E04F 15/02022;
(Continued)

(56) References Cited

U.S. PATENT DOCUMENTS 4,149,435 A 4/1979 Smith
5,022,292 A 6/1991 Hammer et al.
(Continued)

FOREIGN PATENT DOCUMENTS

CN 203769274 U 8/2014
CN 203856178 U 10/2014
(Continued)

*Primary Examiner* — Mahdi H Nejad
(74) *Attorney, Agent, or Firm* — BLANK ROME LLP

(57) ABSTRACT

Disclosed are a ceramic tile leveling bracket, pushing and clamping pliers, and a ceramic tile leveling and laying system. The ceramic tile leveling and laying system comprises: a ceramic tile leveling bracket, an insertion block, and pushing and clamping pliers, wherein the ceramic tile leveling bracket is disposed at a junction of at least two adjacent ceramic tiles, one end of the insertion block is inserted into an insertion block receiving portion of the ceramic tile leveling bracket, and the pushing and clamping pliers push and clamp the insertion block into a ceramic tile leveling bracket such that a bottom face of the insertion block is tangent to upper surfaces of the ceramic tiles. The ceramic tile leveling and laying system is easy to operate, and improves the laying efficiency and laying quality.

7 Claims, 24 Drawing Sheets

Related U.S. Application Data continuation-in-part of application No. 16/470,512, filed as application No. PCT/CN2017/096189 on Aug. 7, 2017, now Pat. No. 10,988,944.

(51) Int. Cl.
*B25B 27/02* (2006.01)
*E04F 21/00* (2006.01)
*E04F 21/18* (2006.01)

(58) Field of Classification Search
CPC ..... E04F 13/0885; E04F 13/142; E04F 15/08; B25B 7/02; B25B 27/02; B25B 7/08
USPC .......................................................... 81/426
See application file for complete search history.

(56) References Cited

U.S. PATENT DOCUMENTS

| | | | | |
|---|---|---|---|---|
| 7,992,354 | B2 | 8/2011 | Doda, Jr. | |
| 8,181,420 | B2 | 5/2012 | Torrents I Comas | |
| 8,622,096 | B2 * | 1/2014 | Yang | A63B 51/02 140/123 |
| 8,887,475 | B2 | 11/2014 | Ghelfi | |
| 9,260,872 | B2 | 2/2016 | Bunch et al. | |
| 9,447,590 | B2 | 9/2016 | Sighinolfi | |
| 9,487,959 | B2 | 11/2016 | Bunch et al. | |
| 9,534,403 | B2 | 1/2017 | Biec | |
| 9,562,365 | B2 | 2/2017 | Bucsa | |
| 10,047,530 | B2 | 8/2018 | Bunch et al. | |
| 10,688,636 | B2 * | 6/2020 | Wu | B25B 7/02 |
| 10,988,944 | B2 | 4/2021 | Li | |
| 11,027,399 | B2 | 6/2021 | Hoppe et al. | |
| D1,084,808 | S * | 7/2025 | Fan | D8/52 |
| 12,390,913 | B2 * | 8/2025 | Kuzmic | B25B 25/005 |
| 2008/0236094 | A1 | 10/2008 | Doda | |
| 2008/0236344 | A1 | 10/2008 | Chiang | |
| 2009/0211034 | A1 | 8/2009 | Lionel | |
| 2013/0319165 | A1 * | 12/2013 | Gillet | B25B 7/12 74/501.6 |
| 2015/0308130 | A1 | 10/2015 | Biec | |
| 2019/0309531 | A1 * | 10/2019 | Li | B25B 7/02 |
| 2020/0086461 | A1 * | 3/2020 | Quesada Barbero | E04F 21/20 |
| 2021/0108425 | A1 | 4/2021 | Li | |
| 2021/0238869 | A1 | 8/2021 | Li | |
| 2022/0241944 | A1 * | 8/2022 | Gu | B25B 9/02 |
| 2025/0041999 | A1 * | 2/2025 | Cipriani | B25B 5/06 |
| 2025/0332699 | A1 * | 10/2025 | Schneider | B25B 27/10 |

FOREIGN PATENT DOCUMENTS

| | | | |
|---|---|---|---|
| CN | 204456801 | U | 7/2015 |
| CN | 204983579 | U | 1/2016 |
| CN | 205713011 | U | 11/2016 |
| EP | 2514886 | A1 | 10/2012 |
| WO | 2008118418 | A1 | 10/2008 |
| WO | 2015161366 | A1 | 10/2015 |

* cited by examiner

CERAMIC TILE LEVELING BRACKET, PUSHING AND CLAMPING PLIERS, AND CERAMIC TILE LEVELING AND LAYING SYSTEM

CROSS-REFERENCE TO RELATED APPLICATIONS

The present application claims priority pursuant to 35 U.S.C. § 121 as a divisional of U.S. application Ser. No. 17/028,820, entitled, "CERAMIC TILE LEVELING BRACKET, PUSHING AND CLAMPING PLIERS, AND CERAMIC TILE LEVELING AND LAYING SYSTEM," filed on Sep. 22, 2020 and issued as U.S. Patent No. 11,661,752 on May 30, 2023, which claims priority pursuant to 35 U.S.C. § 120 as a continuation-in-part of U.S. application Ser. No. 16/470,512, entitled, "CERAMIC TILE LEVELING BRACKET, PUSHING AND CLAMPING PLIERS AND CERAMIC TILE LEVELING AND LAYING SYSTEM," filed on Jun. 17, 2019 and issued as U.S. Pat. No. 10,988,944 on Apr. 27, 2021, which was a National Stage Entry pursuant to 35 U.S.C. § 371 of PCT Application No. PCT/CN2017/096189 filed on Aug. 7, 2017, which claims priority to Chinese Patent Application Ser. No. 201621388937.1, filed on Dec. 18, 2016, all of which are incorporated herein by reference for all that they disclose and teach.

BACKGROUND

Field of the Invention

The present application relates to a ceramic tile laying tool, and in particular to a ceramic tile leveling bracket, pushing and clamping pliers, and a ceramic tile leveling and laying system.

Description of the Prior Art

Ceramic tile inlaying processes often used in the building decoration industry mainly use the traditional manual paving method. The common method for paving floor ceramic tiles is generally divided into a dry laying method and a wet laying method.

The wet laying method uses cement mortar or the like as an adhesive to directly paste the ceramic tile to a wall or a floor. The shortcomings lie in that the flatness and fullness of the paved ceramic tile are relatively poor, and the viscosity thereof is also poor, such that it can only be applied to the pasting of small ceramic tiles, and has a large limitation; and, the workload in the pasting process is relatively large, the technical requirements for the construction personnel are high, and the construction efficiency is low.

The dry laying method directly lays ceramic tiles of a larger size and area, such as floor tiles, on a flat and dried floor. The shortcomings lie in that the thickness of the required laying materials is relatively great, the requirements for the floor flatness are higher, it is necessary to use a sufficient amount of cement to level the entire floor, which requires a high technical level for the construction personnel and the phenomenon of waste of materials is more serious, and if the flatness is not enough, it is easy to produce a hollowing phenomenon, which affects the quality of the laying; and it is necessary to wait for the cement to solidify and dry before starting laying of ceramic tiles and also tamp the ceramic tiles with a rubber hammer after laying, such that the process is complicated, the workload is large, the laying speed is slow, and the construction efficiency is low.

There is a need in the market for a device capable of assisting in ceramic tile laying, which can quickly achieve ceramic tile leveling and improve the construction efficiency.

SUMMARY OF THE INVENTION

An object of the present application is to provide a ceramic tile leveling and laying device, which solves the problems of the prior art, such as complicated leveling and laying processes, low laying efficiency, and high technical requirements for operators.

In order to solve the above technical problems, the present application provides a ceramic tile leveling and laying system, comprising: a ceramic tile leveling bracket disposed at the junction of two adjacent ceramic tiles; an insertion block, with one end thereof being inserted into an insertion block through-hole of the ceramic tile leveling bracket; and a pair of pushing and clamping pliers used to push and clamp the insertion block into the insertion block through-hole such that a bottom face of the insertion block is tangent to upper surfaces of the two ceramic tiles.

In order to solve the above technical problems, the present application further provides a ceramic tile leveling bracket, comprising: a pad used to support bottom faces of two adjacent ceramic tiles; an insert protruding from the middle line of an upper surface of the pad and used to be inserted into a gap between the two adjacent ceramic tiles; and a breakable connecting portion located at a lower portion of the insert and close to the pad; wherein the insert comprises: an insertion block through-hole which penetrates the insert and into which an insertion block is inserted; and/or a bayonet disposed at a lateral side of the insert on one or both sides, with the height of the bayonet being greater than the height of the sheet.

Further, in various embodiments, the insert further comprises a hook-shaped engagement block disposed at a lateral side of the insert on one or both sides and protruding toward the bayonet; wherein the bottom of the bayonet is arc-shaped, and a portion, close to the hook-shaped engagement block, of the bayonet forms a hook-shaped bayonet portion.

Further, in various embodiments, the insert comprises a linear groove downwardly recessed from a surface of the insert on one or both sides, with the bottom of the linear groove being the connecting portion.

Further, in various embodiments, a bottom face of the pad is an arc-shaped surface and is part of a cylindrical side face; and two ends of the pad extend upward from the middle of the bottom face to make contact with the bottom faces of the ceramic tiles.

Further, in various embodiments, the pad comprises: reinforcing ribs disposed at the tops of the two ends of the pad; and/or a pad through-hole penetrating the pad.

Further, in various embodiments, the longitudinal cross-section of the insertion block is wedge-shaped and comprises: an insertion block bottom face, which is a flat surface; an insertion block top face, which is an inclined flat surface and forms an acute angle with the insertion block bottom face; and two or more serrations protruding from the insertion block top face and arranged in the same straight line, wherein each of the serration comprises a vertical serration face and an inclined serration face, and the vertical serration face is perpendicular to the insertion block bottom face.

In order to solve the technical problem of inserting and clamping the insertion block into the insertion block through-hole, the present application further provides pushing and clamping pliers, comprising: a first component comprising a first clamping portion and a first handheld portion; a second component comprising a second clamping portion and a second handheld portion; and a pivot via which the second clamping portion is rotatably connected to the first clamping portion; a first clamping block disposed at a top end of the first clamping portion; a second clamping block disposed at a top end of the second clamping portion and disposed opposite the first clamping block; a first groove downwardly recessed from an inner side wall of the first clamping block, with the direction of opening of the clamping groove facing the second clamping block; and a second groove penetrating the second clamping block and disposed opposite the clamping groove.

Further, in various embodiments, the pushing and clamping pliers further comprise a pulling device used to break the sheet of the ceramic tile leveling bracket to remove the portion, above the sheet, of the insert.

Further, in various embodiments, the pulling device comprises: a hooked corner portion protruding in a barbed shape from an outer side wall of the first clamping block; and a rounded corner portion disposed at the junction of a side wall and the top of the second clamping block; or the pulling device comprises: a hooked corner portion protruding in a barbed shape from an outer side wall of the second clamping block; and a rounded corner portion disposed at the junction of a side wall and the top of the first clamping block.

Further, in various embodiments, the pushing and clamping pliers further comprise: clamping teeth disposed at an inner side face of the first clamping block and disposed opposite the second clamping block; and/or disposed at an inner side face of the second clamping block and disposed opposite the first clamping block.

Further, in various embodiments, the pushing and clamping pliers further comprise an elastic member, with one end thereof being connected to the first clamping portion and the other end thereof being connected to the second clamping portion, or with one end thereof being connected to the first handheld portion and the other end thereof being connected to the second handheld portion.

Further, in various embodiments, the pushing and clamping pliers further comprise: a first guiding post protruding from a side face of the first clamping portion; and a second guiding post protruding from a side face of the second clamping portion and disposed opposite the first guiding post; wherein the elastic member is a coil spring, with one end thereof being sheathed over the first guiding post, and the other end thereof being sheathed over the second guiding post.

Further, in various embodiments, the pushing and clamping pliers further comprise: a first guiding post protruding from a side face of the first handheld portion; and a second guiding post protruding from a side face of the second handheld portion and disposed opposite the first guiding post; wherein the elastic member is a coil spring, with one end thereof being sheathed over the first guiding post, and the other end thereof being sheathed over the second guiding post.

Further, in various embodiments, the pushing and clamping pliers further comprise a locking device used to switch the pushing and clamping pliers between opened and closed states; when the locking device is locked, the elastic force of the elastic member is overcome, so that the pushing and clamping pliers are in a closed state; and when the locking device is unlocked, the pushing and clamping pliers are in an opened state under the action of the elastic force of the elastic member.

Further, in various embodiments, the pushing and clamping pliers further comprise: a first bent portion, which is part of the first clamping portion and is sheathed outside the pivot; and a second bent portion, which is part of the second clamping portion and is sheathed outside the pivot.

Further, in various embodiments, the locking device comprises: a locking slot disposed at an outer side wall of the first bent portion; a locking member rotatably fitted to a surface of the end of the second clamping portion and disposed opposite the locking slot; and a blocking block disposed at a surface of the end of the first clamping portion and disposed opposite the second bent portion, wherein when the pushing and clamping pliers have the maximum opening angle, the blocking block comes into contact with an outer side wall of the second bent portion.

Further, in various embodiments, the locking device comprises: a locking slot disposed at an outer side wall of the second bent portion; a locking member rotatably fitted to a surface of the end of the first clamping portion and disposed opposite the locking slot; and a blocking block disposed at a surface of the end of the second clamping portion and disposed opposite the first bent portion, wherein when the pushing and clamping pliers have the maximum opening angle, the blocking block comes into contact with an outer side wall of the first bent portion.

Further, in various embodiments, the locking member comprises: a locking member body rotatably connected to the end of the first clamping portion or the second clamping portion via a second pivot; a locking engagement block protruding from a surface of the locking member body; and a tab protruding from the surface of the locking member body to drive the locking member body to rotate.

Further, in various embodiments, the locking device is locked when the locking engagement block is engaged into the locking slot; and the locking device is unlocked when the locking engagement block is disengaged from the locking slot.

Another object of the present application is to provide a ceramic tile leveling and laying device that can be applied when at least two adjacent ceramic tiles are laid, which can improve the efficiency while saving the user's physical strength.

In order to solve the above technical problems, the present application provides a ceramic tile leveling and laying system, comprising: a ceramic tile leveling bracket configured to be able to be disposed at the junction of at least two adjacent ceramic tiles; an insertion block, configured to be inserted into the ceramic tile leveling bracket; and a pair of pushing and clamping pliers, which is used to push and clamp the insertion block into the ceramic tile leveling bracket such that a bottom face of the insertion block is tangent to upper surfaces of the at least two adjacent ceramic tiles; wherein the ceramic tile leveling bracket comprises: a pad, with an upper surface of the pad being configured to be able to come into contact with lower surfaces of the at least two adjacent ceramic tiles to support the ceramic tiles; an insert provided on the upper surface of the pad and configured to pass through a gap between the adjacent the ceramic tiles; the insert comprises at least one insertion block receiving portion used to receive the insertion block; and a connecting portion provided on the insert and configured to break under an action of an external force so that at least part of the insert is separated from the pad; wherein the insertion block is wedge-shaped and has a first end and a second end lower than the first second, and a bottom surface of the insertion block in contact with the ceramic tile is a flat surface; the insertion block comprising a protrusion and at least one serration portion, wherein the serration portion comprising: a serration portion top face, which is an inclined surface relative to the bottom surface of the insertion block and forms an acute angle with the bottom surface of the insertion block; and at least two serrations protruding from a top face of the serration portion; and wherein the protrusion is located on the first end of the insertion block; wherein the pushing and clamping pliers comprises: a first component comprising a first clamping portion and a first handheld portion; a second component comprising a second clamping portion and a second handheld portion; a pivot via which the second clamping portion is rotatably connected to the first clamping portion; a first clamping block disposed at a top end, away from the first handheld portion, of the first clamping portion; a second clamping block disposed at a top end, away from the second handheld portion, of the second clamping portion; a first groove inwardly recessed from an inner side wall of the first clamping block, with the direction of opening of the clamping groove facing the second clamping portion; and a second groove, which penetrates the second clamping block toward the first clamping block and is disposed opposite the first groove; the first groove and the second groove being configured to hold the insertion block when the pushing and clamping pliers push the insertion block into the ceramic tile leveling bracket; wherein the first clamping portion extends and bends from the first handheld portion, the second clamping portion extends and bends from the second handheld portion, and the first clamping portion and the second clamping portion bend in the same direction.

Further, the ceramic tile leveling bracket further comprises a rib that is provided on the upper surface of the pad and is separated from the insert, and a projection of the rib on the upper surface of the pad forms an angle with a projection of the insert on the upper surface of the pad; and the bottom surface of the insertion block is provided with a strip groove.

The ceramic tile leveling bracket can be used for laying three or four ceramic tiles at the same time by setting the rib. Specifically, the ceramic tile leveling bracket is arranged in the adjacency of three or four ceramic tiles, so that the rib is located between two of the ceramic tiles, and the work efficiency can be improved. The groove provided on the bottom surface of the insertion block can be matched with the rib, so that when the insertion block is inserted into the insert, the bottom surface of the insertion block is tangent to the upper surface of the ceramic tiles, and will not be affected by the rib.

In order to solve the above problems, the present application further provides a ceramic tile leveling bracket, comprising: a pad, with an upper surface of the pad being configured to be able to come into contact with lower surfaces of at least two adjacent ceramic tiles to support the ceramic tiles; an insert provided on the upper surface of the pad and configured to pass through a gap between the adjacent the ceramic tiles; and a connecting portion provided on the insert and configured to break under an action of an external force so that at least part of the insert is separated from the pad; wherein the insert comprises: at least one insertion block receiving portion used to receive an insertion block.

Further, in various embodiments, the insertion block receiving portion comprises: a first insertion block receiving portion provided in the insert; and/or a second insertion block receiving portion provided on at least one side of the insert in the lengthwise direction of the insert.

Further, in various embodiments, a thickness of the connecting portion is less than a thickness of the insert so as to form a linear groove in the insert.

Further, in various embodiments, the ceramic tile leveling bracket further comprises a rib that is provided on the upper surface of the pad and is separated from the insert, and a projection of the rib on the upper surface of the pad forms an angle with a projection of the insert on the upper surface of the pad.

Further, in various embodiments, the rib is located between an outer edge of the pad and the insert, the insert having a first surface and a second surface, the first surface referring to a surface of the insert facing the rib, the second surface referring to a surface of the insert opposite to the first surface, a first end of the rib not exceeding the outer edge of the pad, and a second end of the rib not exceeding the second surface of the insert.

Further, in various embodiments, the first end of the rib does not exceed a first outer edge of the pad, and the second end of the rib does not exceed a second outer edge, opposite the first outer edge, of the pad.

Further, in various embodiments, the pad comprises at least one pad groove that penetrates the pad in the thickness direction of the pad, and the pad groove is disposed on a lateral side, facing the ceramic tile, of the pad.

Further, in various embodiments, the insertion block is wedge-shaped and has a first end and a second end lower than the first second, and a bottom surface of the insertion block in contact with the ceramic tile is a flat surface; the insertion block comprising a protrusion and at least one serration portion wherein the serration portion comprises: a serration portion top face, which is an inclined surface relative to the bottom surface of the insertion block and forms an acute angle with the bottom surface of the insertion block; at least two serrations protruding from a top face of the serration portion; wherein the protrusion is located on the first end of the insertion block.

Further, in various embodiments, the bottom surface of the insertion block is provided with a strip groove.

In order to solve the above problems, the present application further provides pushing and clamping pliers used to push an insertion block into a ceramic tile leveling bracket, the pushing and clamping pliers comprising: a first component comprising a first clamping portion and a first handheld portion; a second component comprising a second clamping portion and a second handheld portion; a pivot via which the second clamping portion is rotatably connected to the first clamping portion; a first clamping block disposed at a top end, away from the first handheld portion, of the first clamping portion; a second clamping block disposed at a top end, away from the second handheld portion, of the second clamping portion; a first groove inwardly recessed from an inner side wall of the first clamping block, with the direction of opening of the clamping groove facing the second clamping portion; and a second groove, which penetrates the second clamping block toward the first clamping block and is disposed opposite the first groove; the first groove and the second groove being configured to hold the insertion block when the pushing and clamping pliers push the insertion block into the ceramic tile leveling bracket; wherein the first clamping portion extends and bends from the first handheld portion, the second clamping portion extends and bends from the second handheld portion, and the first clamping portion and the second clamping portion bend in the same direction.

Further, in various embodiments, the included angle between the first clamping portion and the first handheld portion is an obtuse angle, and the included angle between the second clamping portion and the second handheld portion is an obtuse angle.

Further, in various embodiments, the pushing and clamping pliers further comprises an elastic member, one end of the elastic member connected to the first component and another end of the elastic member connected to the second component, the elastic member configured to exert an elastic force to cause the first component and the second component to move in an opening direction.

Further, in various embodiments, the pushing and clamping pliers further comprises: a first guiding post protruding from a side face, facing to the second component, of the first component; a second guiding post protruding from the second component and disposed opposite the first guiding post; wherein the elastic member is a spring with one end of the spring being sheathed over the first guiding post, and another end of the spring being sheathed over the second guiding post.

Further, in various embodiments, the pushing and clamping pliers further comprise a locking device configured to overcome the elastic force of the elastic member when the locking device is locked, so that the first component and the second component are in a closed state.

Further, in various embodiments, further comprising: a first bent portion, which is part of the first clamping portion and is sheathed outside the pivot; and a second bent portion, which is part of the second clamping portion and is sheathed outside the pivot; the locking device comprises: a locking slot disposed on the first clamping portion and located away from an outer side wall of the first bent portion of the first clamping portion; a locking member rotatably connected to the second clamping portion and disposed opposite the locking slot; and a blocking block disposed on the first clamping portion and disposed opposite the second bent portion of the second clamping portion, the blocking block being configured such that when the pushing and clamping pliers have the maximum opening angle, the blocking block comes into contact with the second bent portion of the second clamping portion.

Further, in various embodiments, the locking member comprises: a locking member body rotatably connected to the second clamping portion via a second pivot; a locking engagement block protruding from a surface of the locking member body to cooperate with the locking slot; and a tab protruding from the surface of the locking member body to drive the locking member body to rotate.

Further, in various embodiments, the locking member comprises: a locking member body rotatably connected to the second clamping portion via a second pivot; a locking engagement block, which has an obtuse angle and is located at a surface of the locking member body to cooperate with the locking slot; a limiting block formed by the surface of the locking member body protruding outward, with a side wall of the limiting block being bent; and a toggle portion used to move the locking member body; the toggle portion being disposed at the surface of the locking member body, a side wall of the toggle portion being inwardly recessed from the surface of the locking member body, and the side wall of the toggle portion being provided with a toothed pattern.

Further, in various embodiments, further comprising: a pulling device that comprises a hooked corner portion and a rounded corner portion, the hooked corner portion being in a barbed shape; wherein the hooked corner portion is disposed at one of the first clamping block and the second clamping block, and the rounded corner portion is disposed at the other of the first clamping block and the second clamping block.

Further, in various embodiments, further comprising clamping teeth, wherein the clamping teeth are disposed on a side face, facing the second clamping block, of the first clamping block, and/or the clamping teeth are disposed on a side face, facing the first clamping block, of the second clamping block.

The present application has the advantages that, by providing a ceramic tile leveling bracket, pushing and clamping pliers and a ceramic tile leveling and laying system, in the ceramic tile laying process, the ceramic tile leveling bracket and the insertion block are used to support the junction of the at least two adjacent ceramic tiles, such that the upper surfaces of multiple ceramic tiles in the same area are kept in the same plane, the operation is simple and convenient, and the laying efficiency and the leveling quality are effectively improved, thereby facilitating large-scale application.

Figure 1:
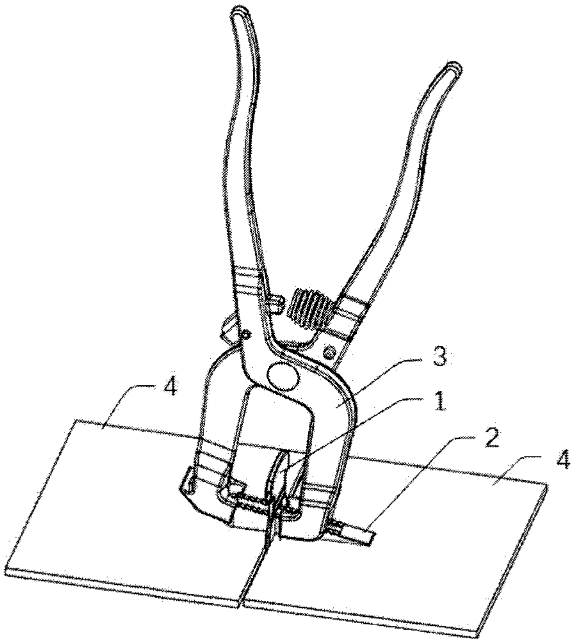
FIG. 1 is a schematic structural diagram of a ceramic tile leveling and laying system in a use state according to Embodiment 1 of the present application.

1 Ceramic tile leveling bracket, 2 Insertion block, 3 Pushing and clamping pliers, 4 Ceramic tile, 41 Side of ceramic tile, 42 Lower surface of ceramic tile, 43 Gap;

11 Pad, 12 Insert, 13 First connecting portion, 14 Reinforcing rib, 15 Pad through-hole, 16 Insertion block through-hole;

17 Linear groove, 18 Bayonet, 19 Hook-shaped engagement block, 20 Hook-shaped bayonet portion;

210 Serration portion, 21 Serration portion bottom face, 22 Serration portion top face, 23 Serration, 24 Vertical serration face, 25 Inclined serration face;

2101 First end, 2102 Second end, 2103 Protrusion, 31 First component, 32 Second component, 33 Pivot, 34 Clamping teeth, 35 Pulling device, 36 Elastic member; 37 Locking device;

311 First clamping portion, 312 First handheld portion, 313 First clamping block, 314 First groove, 315 First bent portion;

321 Second clamping portion, 322 Second handheld portion, 323 Second clamping block, 324 Second groove, 325 Second bent portion;

351 Hooked corner portion, 352 Rounded corner portion, 361 First guiding post, 362 Second guiding post;

371 Locking slot, 372 Locking member, 373 Blocking block;

3721 Locking member body, 3722 Locking engagement block, 3723 Tab, 3724 Second pivot, 3725 Gasket;
101 Second ceramic tile leveling bracket, 102 Second insertion block;
111 Second pad, 1111 Upper surface of second pad, 1112 First middle line of second pad, 1113 Bottom face of second pad, 1114 Lateral side of second pad, 1115 Pad groove;
112 Second insert, 113 Second connecting portion, 114 Second linear groove, 115 Extension end, 116 First insertion block receiving portion, 117 Limiting portion, 1121 First connection piece, 1122 Second connection piece, 118 Second insertion block receiving portion, 1161 Upper edge of first insertion block receiving portion, 1171 Lower edge of limiting portion, 1181 Upper edge of second insertion block receiving portion, 1120 Insertion block receiving portion;
120 Second serration portion, 121 Bottom face of second insertion block, 122 Serration portion top face, 123 Serration, 124 Serration slot, 125 End portion, 126 Base, 1261 First side of base, 1262 Second side of base, 1263 Second protrusion;
201 Third ceramic tile leveling bracket, 202 Third insertion block;
211 Third pad, 2111 Upper surface of third pad, 2112 Second middle line of third pad, 2113 Outer edge of third pad;
212 Third insert, 216 Third insertion block through-hole;
219 First rib, 2191 First end of first rib, 2192 Second end of first rib;
301 Fourth ceramic tile leveling bracket, 302 Fourth insertion block;
311 Fourth pad, 3111 Upper surface of fourth pad, 3112 Third middle line of fourth pad, 3113 First outer edge of fourth pad, 3114 Fourth outer edge of fourth pad;
312 Fourth insert;
319 Second rib, 3191 First end of second rib, 3192 Second end of second rib;
401 Fifth ceramic tile leveling bracket, 411 Fifth pad, 412 Fifth insert, 4111 Upper surface of fifth pad, 419 Third rib;
601 Sixth ceramic tile leveling bracket, 611 Sixth pad, 612 Sixth insert, 6111 Upper surface of sixth pad, 519 Fourth rib, 5191 First portion of fourth rib, 5192 Second portion of fourth rib;
500 Third pushing and clamping pliers, 501 Third component, 502 Fourth component, 503 Third pivot, 504 Second clamping teeth, 505 Second elastic member, 506 Second locking device, 507 Second blocking block, 508 Second pulling device;
5011 Third clamping portion, 5012 Third handheld portion, 5013 Third clamping block, 5014 Third groove, 5015 Third bent portion, 50131 Side wall of third clamping block, 50132 Top of third clamping block;
5021 Fourth clamping portion, 5022 Fourth handheld portion, 5023 Fourth clamping block, 5024 Fourth groove, 5025 Fourth bent portion, 50231 Side wall of fourth clamping block, 50232 Top of fourth clamping block;
5051 Third guiding post, 5052 Fourth guiding post;
5061 Second locking slot, 5062 Second locking member, 50621 Second locking member body, 50622 Second locking engagement block, 50623 Limiting block, 50624 Toggle portion, 50625 Fourth pivot, 50626 Toothed pattern;
5081 Second hooked corner portion, 5082 Second rounded corner portion;
600 Third pushing and clamping pliers, 606 Third locking device, 607 Third blocking block;
6061 Third locking slot, 6062 Third locking member, 60621 Third locking member body, 60622 Third locking engagement block, 60623 Second tab, 60625 Fifth pivot, 60626 Second gasket.

DETAILED DESCRIPTION OF THE EMBODIMENTS

The preferred embodiments of the present application are described below with reference to the accompanying drawings, and the present application can be fully introduced to those skilled in the art, such that the technical content thereof will be clearer and is easy to understand. The present application can be embodied in various forms of embodiments, and the scope of protection of the present application is not limited to the embodiments mentioned herein.

In the drawings, the same reference numeral indicates components having the same structure, and similar reference numerals indicate assemblies having similar structures or functions throughout. The size and thickness of each assembly shown in the figures are shown arbitrarily, and the present application does not define the size and thickness of each assembly. In order to make the illustration clearer, the thickness of the component in some places of the figures is appropriately exaggerated.

Orientation terms mentioned in the present application, such as "upper", "lower", "front", "rear", "left", "right", "inner", "outer", "side" etc., are merely orientations in the figures and are only intended to explain and illustrate the present application and are not intended to limit the scope of protection of the present application.

When a certain assembly is described as "on" a further assembly, the assembly can be placed directly on the further assembly; and there may also be an intermediate assembly on which the assembly is placed, and the intermediate assembly placed on the further assembly. When an assembly is described as "mounted to" or "connected to" a further assembly, it can be understood as either "mounted" or "connected" directly, or an assembly being indirectly "mounted to" or "connected to" the further assembly via an intermediate assembly.

Embodiment 1

As shown in FIG. 1, this embodiment provides a ceramic tile leveling and laying system, comprising a ceramic tile leveling bracket 1, an insertion block 2 and pushing and clamping pliers 3, which cooperate with one another to assist in leveling of ceramic tiles 4 in the ceramic tile laying process, such that all the upper surfaces of the ceramic tiles lie in the same plane.

During the construction of the ceramic tile laying, a user can apply an adhesive, such as cement and a ceramic tile adhesive, onto a floor or a wall according to requirements, and then multiple ceramic tiles are subsequently laid on the floor or the wall. During laying, a ceramic tile leveling bracket 1 is placed at the junction of any two adjacent ceramic tiles 4, and taking a square ceramic tile as an example, it is necessary to provide a ceramic tile leveling bracket 1 on each of four sides thereof.

Figure 2:
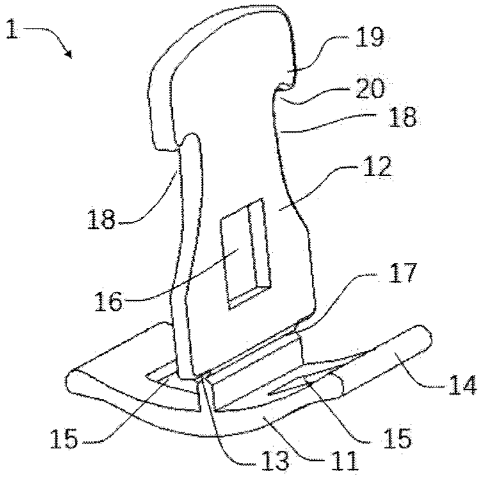
FIG. 2 is a schematic perspective structural diagram of the ceramic tile leveling bracket according to Embodiment 1 of the present application.
Figure 3:
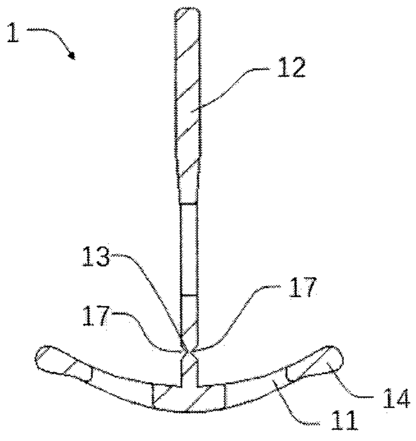
FIG. 3 is a schematic diagram of the longitudinal cross-section of the ceramic tile leveling bracket according to Embodiment 1 of the present application.
Figure 4:
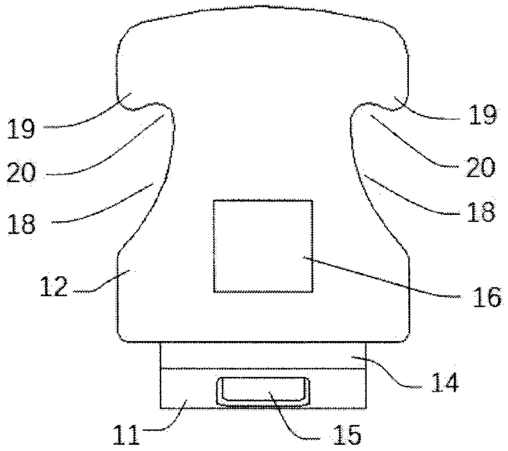
FIG. 4 is a schematic front structural diagram of the ceramic tile leveling bracket according to Embodiment 1 of the present application.

As shown in FIGS. 2-4, the ceramic tile leveling bracket 1 comprises a pad 11 and an insert 12, which are integrally provided. The insert 12 protrudes from the middle line of the upper surface of the pad 11. The longitudinal cross-section of the ceramic tile leveling bracket 1 approximates an inverted T-shape. The pad 11 is disposed below two adjacent ceramic tiles 4, and the insert 12 is inserted into a gap between the two adjacent ceramic tiles 4.

The bottom face of the pad 11 is an arc-shaped surface and is part of a cylindrical side face. Two ends of the pad 11 smoothly extend upward from the middle of the bottom face, and the tops of the two ends of the pad 11 are provided with reinforcing ribs 14 to make contact with and support the bottom faces of the two adjacent ceramic tiles 4. The pad 11 is provided with two or more pad through-holes 15 which penetrate the pad 11. In the ceramic tile leveling process, an adhesive under the ceramic tile 4 will enter from the pad through-holes 15 into the space enclosed by the pad 11 and the lower surfaces of the ceramic tiles 4. During the curing of the adhesive, the pad 11 and the two ceramic tiles 4 are fixed into one body.

Figure 5:
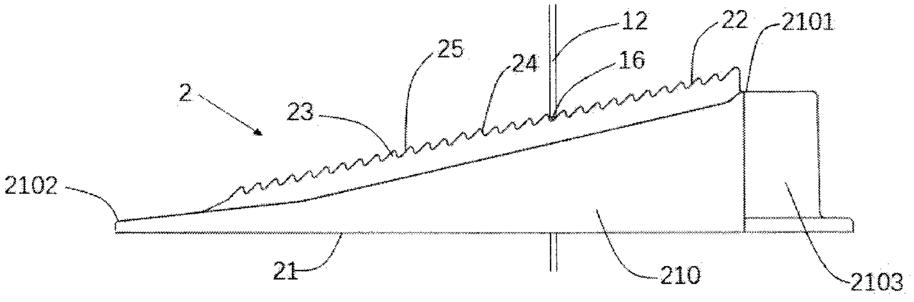
FIG. 5 is a schematic cross-sectional structural diagram of an insertion block and an insertion block through-hole according to Embodiment 1 of the present application.

As shown in FIGS. 4-5, the middle of the insert 12 is provided with an insertion block through-hole 16, the insertion block through-hole 16 penetrates the insert 12, and an insertion block 2 may be inserted into the insertion block through-hole. The longitudinal cross-section of the insertion block 2 is wedge-shaped, and has a first end 2101 and a second end 2102 opposite the first end 2101. The first end 2101 is higher than the second end 2102, so that the longitudinal section of the insertion block 2 is wedge-shaped. In the embodiment, the insertion block only comprises one serration portion 210, which comprises a serration portion bottom face 21 and a serration portion top face 22. Since the insertion block 2 comprises only one serration portion 210, the serration portion bottom face 21 is the bottom face of the insertion block 2, and the serration portion top face 22 is the top face of the insertion block 2. The serration portion bottom face 21 is a flat surface, and the serration portion top face 22 is an inclined face relative to the serration portion bottom face 21, and the angle between the serration portion bottom face 21 and the serration portion top face 22 is an acute angle, preferably of 20-30 degrees. The serration portion top face 22 is provided with two or more protruding serrations 23, and the multiple serrations are arranged in the same straight line. Each of the serrations 23 comprises a vertical serration face 24 and an inclined serration face 25, the vertical serration face 24 is perpendicular to the serration portion bottom face 21, and the inclined angle of the inclined serration face 25 is consistent with the inclined angle of the serration portion top face 22.

As shown in FIG. 1, after the ceramic tile leveling bracket 1 is fitted into the gap between the two adjacent ceramic tiles 4, the lower second end 2102 of the insertion block 2 can be inserted into the insertion block through-hole 16, and the transverse cross-section of the higher first end 2101 of the insertion block 2 is semicircular, forming the protrusion 2103 of the insertion block 2, which is matched with the pushing and clamping pliers 3. The user can push the insertion block 2 as far as possible into the insertion block through-hole 16 by means of the pushing and clamping pliers 3, such that the insert 12 can be engaged into the serration gap between two serrations on the serration portion top face 22 so as to lock the positions of the two ceramic tiles 4. In the process of gradually pushing the insertion block 2 into the insertion block through-hole 16, the pad 11 moves in a small range relative to the ceramic tiles 4, and the ceramic tiles 4 are lifted. The heights of the two ceramic tiles 4 are finely adjusted such that the serration portion bottom face 21 is tangent to the upper surfaces of the two ceramic tiles 4. At this time, the adhesive under the ceramic tiles 4 is not cured and can flow through the pad through-holes 15 into the space enclosed by the pad 11 and the ceramic tiles 4. After the adhesive is cured, the pad 11 and the ceramic tiles 4 are fixed into one body. Since the serration portion bottom face 21 is a flat surface, the upper surfaces of the two ceramic tiles 4 are necessarily in the same plane, such that the leveling process of the two ceramic tiles can be completed.

In this embodiment, the ceramic tile 4 is rectangular or square, and the junctions between the four sides thereof and the other ceramic tiles can be respectively provided with a ceramic tile leveling bracket 1 according to the above method. In the similar manner, the upper surfaces of all the ceramic tiles laid on the construction site can be positioned in the same plane by means of multiple ceramic tile leveling brackets 1, and then left to stand for a period of time to cure the adhesive (cement, ceramic tile adhesive, etc.).

As shown in FIGS. 2-3, the lower portion, close to the pad 11, of the insert 12 is provided with a breakable first connecting portion 13, the first connecting portion 13 is a thin sheet and is part of the insert 12 and is in the shape of a straight line having a certain width, and the user can tear the first connecting portion 13 along the straight line to break same such that the insert 12 is divided into upper and lower portions from the tear. The height of the first connecting portion 13 is substantially flush with the lower surface of the ceramic tile 4.

The insert 12 further comprises a linear groove 17 inwardly recessed from a surface of the insert 12 on one or both sides, and the bottom of the linear groove 17 is the first connecting portion 13. With the groove structure of the first connecting portion 13 on one or both sides, the first connecting portion 13 is relatively thin, and has a thickness of generally about 1-2 mm. Such groove structure makes the first connecting portion 13 easy to tear. After the adhesive is cured, the user can violently break or tear the upper portion of the insert 12 from the first connecting portion 13 with a conventional plier tool.

As shown in FIG. 4, in this embodiment, a lateral side of one side of the insert 12 is provided with a bayonet 18, or lateral sides of two sides of the insert 12 are respectively provided with a bayonet 18, and the height of the bayonet 18 is greater than that of the first connecting portion 13. The insert 12 further comprises a hook-shaped engagement block 19 that is disposed at a lateral side of the insert 11 on one or both sides and protrudes toward the bayonet 18. The longitudinal cross-section of the bottom of the bayonet 18 is arc-shaped, and a portion, close to the hook-shaped engagement block 19, of the bayonet 18 forms a hook-shaped bayonet portion 20. The bottom of the bayonet 18 is a contact edge that can cooperate with an outer edge of a hooked corner portion 351 of the pushing and clamping pliers 3. The longitudinal cross-section of the bottom of the bayonet 18 is arc-shaped, and the opening end of the arc-shaped contact edge (i.e., the hook-shaped engagement block 19) is bent downward.

The user can remove the upper part of the insert 12 from the first connecting portion 13 by means of a pulling tool such as a small claw hammer. Specifically, the barbed structure of the pulling tool is used to engage into the bayonet 18 to remove the portion, above the first connecting portion 13, of the insert based on the lever principle. In this embodiment, a pulling device is provided in the pushing and clamping pliers 3, and the pulling device has a hook-shaped bayonet portion 20 which can be engaged into the bayonet 18 to quickly and efficiently remove part of the insert, as will be described in detail below.

In the construction of ceramic tile laying, after the cement, the ceramic tile adhesive or the like is cured, the inserts 12 of all the ceramic tile leveling brackets 1 are broken from the first connecting portion 13, and after the upper half of the insert 12 and the insertion block 2 are removed and cleaned, all the gaps between the ceramic tiles are filled and flattened, and the entire process of ceramic tile laying can be completed. The operation is simple, the construction processes can be effectively reduced, and the construction efficiency is improved.

In this embodiment, the pushing and clamping pliers 3 are used to push and clamp the insertion block 2 into the insertion block through-hole 16 such that the serration portion bottom face 21 is tangent to the upper surfaces of the two ceramic tiles 4.

Figure 6:
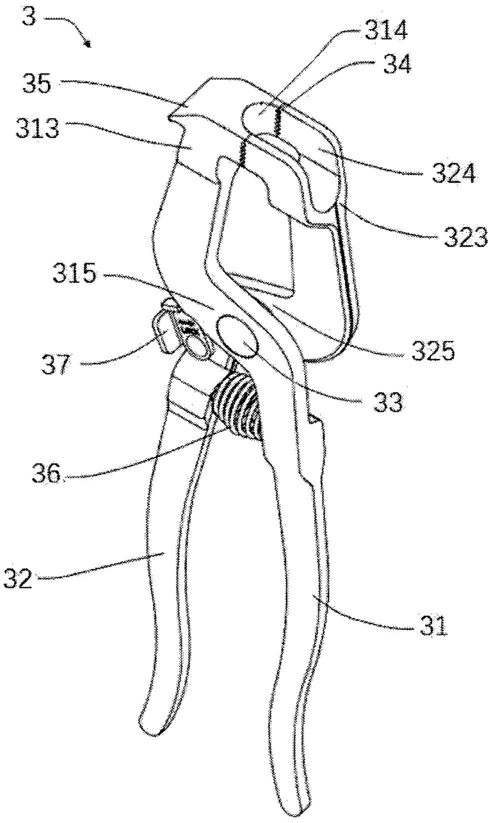
FIG. 6 is a schematic structural diagram of pushing and clamping pliers according to Embodiment 1 of the present application.
Figure 7:
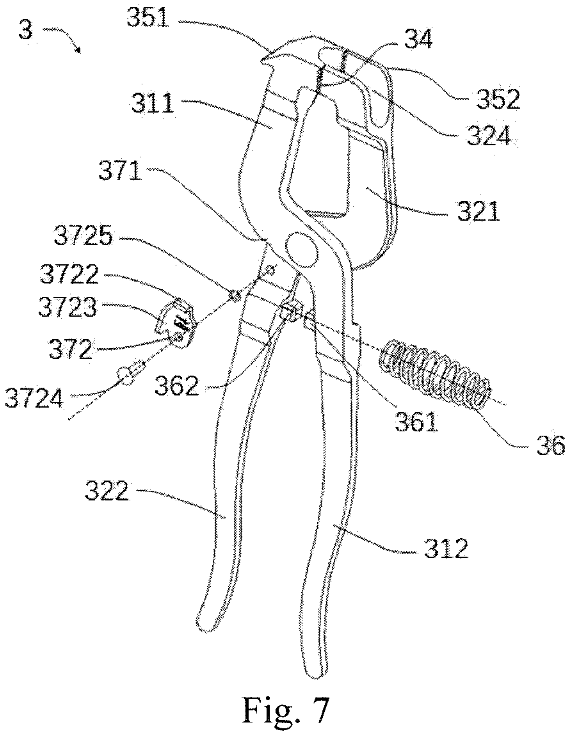
FIG. 7 is a schematic exploded structural diagram of the pushing and clamping pliers according to Embodiment 1 of the present application.

As shown in FIGS. 6 and 7, the pushing and clamping pliers 3 comprise a first component 31, a second component 32, and a pivot 33. The first component 31 comprises a first clamping portion 311 and a first handheld portion 312, and the second component 32 comprises a second clamping portion 321 and a second handheld portion 322, the second clamping portion 311 being rotatably connected to the first clamping portion 311 via the pivot 33. A top end of the first clamping portion 311 is provided with a first clamping block 313, and a top end of the second clamping portion 321 is provided with a second clamping block 323. The second clamping block 323 is disposed at the same height as and opposite the first clamping block 313.

The inner side faces opposite each other of the first clamping block 313 and the second clamping block 323 may be provided with clamping teeth 34. The clamping teeth 34 of the first clamping block 313 are disposed opposite the second clamping block 323, and the clamping teeth 34 of the second clamping block 323 are disposed opposite the first clamping block 313. In other words, the clamping teeth 34 of the first clamping block 313 are opposite the clamping teeth 34 of the second clamping block 323. The inner side faces opposite each other of the two clamping blocks are clamping faces, and the clamping teeth 34 can increase the coefficient of friction between the clamping faces and the surface of the clamped object, thereby preventing the clamped object from slipping out.

As shown in FIGS. 1 and 6-7, in this embodiment, the inner side wall of the first clamping block 313 is provided with a downwardly recessed first groove 314, with the direction of opening thereof facing the second clamping block 323; and the second clamping block 323 is provided with a second groove 324 that transversely penetrates the entire second clamping block 323, and the second groove 324 is disposed opposite and in the same straight line as the first groove 314. Portions, on the two sides and at the bottom of the second groove 324, of the second clamping block 323 form a bifurcated structure comprising two bifurcated portions, the second groove 324 is located between the two bifurcated portions, and the clamping teeth 34 are provided on the clamping faces on the inner sides of the two bifurcated portions.

Figure 9:
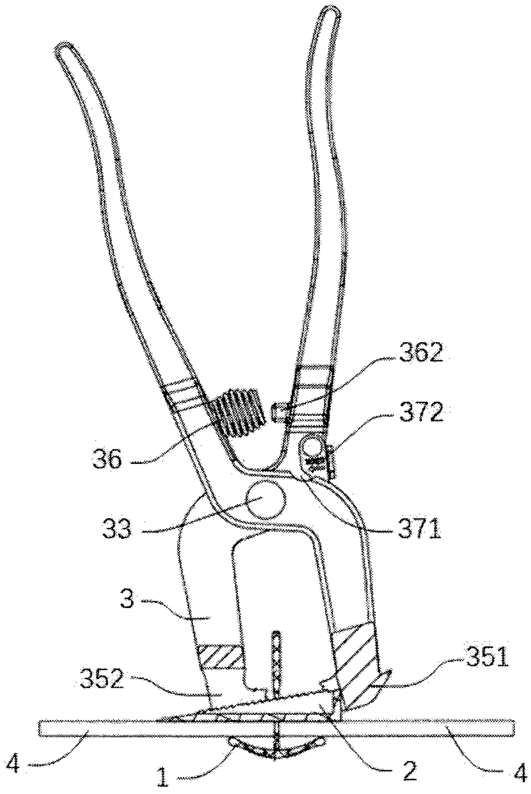
FIG. 9 is a side view of the ceramic tile leveling and laying system in a use state according to Embodiment 1 of the present application.

As shown in FIG. 9, the second groove 324 and the first groove 314 are configured to clamp the insertion block 2 such that the insertion block 2 is pushed and clamped into the insertion block through-hole 16 of the ceramic tile leveling bracket 1. When the lower end of the insertion block 2 is pushed into the insertion block through-hole 16, the user puts the pushing and clamping plier 3 upside down and opens same, and the protrusion 2103 of the higher first end 2101 of the insertion block 2 is placed in the first groove 314, the lower second end 2102 of the insertion block 2 is placed in the second groove 324, and then the two handheld portions 312 and 322 are closed by force. During the closing of the pushing and clamping pliers 3, the first clamping block 313 pushes the higher end of the insertion block 2 into the insertion block through-hole 16, the bifurcated portion of the second clamping block 323 is pushed against one side of the insert 12, and the lower second end 2102 of the insertion block 2 slides through the second groove 324 to secure the insertion block 2 in the insertion block through-hole 16, such that the insert 12 can be engaged onto a certain serration on the serration portion top face 22, thereby locking the positions of the two ceramic tiles 4.

In this embodiment, the pushing and clamping pliers 3 further comprise a pulling device 35 for breaking the first connecting portion 13 of the ceramic tile leveling bracket 1 to remove the portion, above the first connecting portion 13, of the insert 12.

As shown in FIGS. 6-7, the pulling device 35 comprises a hooked corner portion 351 and a rounded corner portion 352. The hooked corner portion 351 protrudes in a barbed shape from the outer side wall of the first clamping block 313, and the outer edge of the hooked corner portion 351 is a smooth flat surface or an arc-shaped curved surface, and is disposed at the junction of the side wall and the top of the first clamping block 313. The rounded corner portion 352 is disposed at the junction of the side wall and the top of the second clamping block 323, and each of the two bifurcated portions has a rounded corner portion 352. Alternatively, the hooked corner portion 351 protrudes in a barbed shape from the outer side wall of the second clamping block 323, and the two bifurcated portions protrude outwardly and extend to form a hooked corner portion 351, and the hooked corner portion 351 has an outer edge that is a smooth flat surface or an arc-shaped curved surface, and is disposed at the junction of the side wall and the top of the second clamping block 323. The rounded corner portion 352 is provided at the junction of the side wall and the top of the first clamping block 313.

In this embodiment, the lateral sides of two sides of the insert 12 are respectively provided with a bayonet 18 and a hook-shaped engagement block 19, the hook-shaped engagement block 19 is disposed at the upper portion of the bayonet 18 and protrudes toward the bayonet 18, and a portion, close to the hook-shaped engagement block 19, of the bayonet 18 forms a hook-shaped bayonet portion 20. The bottom of the bayonet 18 is a contact edge that can cooperate with an outer edge of a hooked corner portion 351 of the pushing and clamping pliers 3. The longitudinal cross-section of the bottom of the bayonet 18 is arc-shaped, and the opening end of the arc-shaped contact edge (i.e., the hook-shaped engagement block 19) is bent downward.

Figure 10:
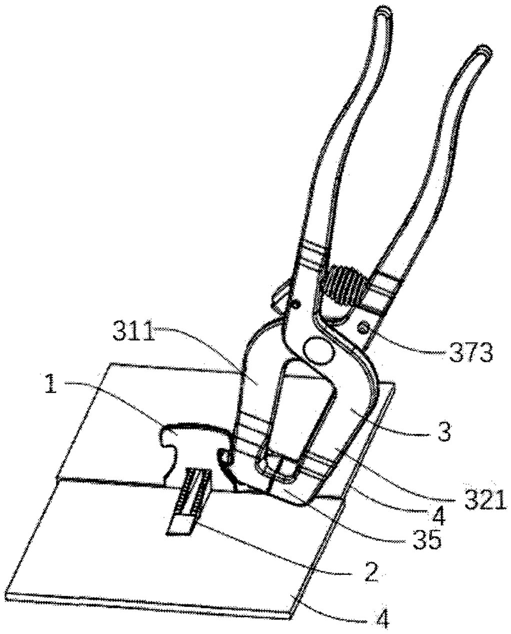
FIG. 10 is a schematic diagram of the removal of an insert with the pushing and clamping pliers according to Embodiment 1 of the present application.

In the ceramic tile laying process, after the adhesive is cured, the pad 11 and the ceramic tiles 4 are all fixed by the adhesive, and the user can remove the upper half of the insert 12 by means of the pulling device 35 of the pushing and clamping pliers 3. As shown in FIG. 10, at first, the user needs to close and lock the pushing and clamping pliers 3, the hooked corner portion 351 of the pulling device 35 is engaged into the bayonet 18 on the lateral side of the insert 12, the outer edge of the hooked corner portion 351 slides along the contact edge of the bayonet 18, the hooked corner portion 351 is engaged into the hook-shaped bayonet portion 20, and the rounded corner portion 352 of the pulling device 35 is placed on the upper surfaces of the ceramic tiles 4. Based on the principle of lever, the user can pull the upper half of the insert 12 upward with the rounded corner portion 352 as the fulcrum, and since the lower portion, close to the pad 11, of the insert 12 is provided with the breakable first connecting portion 13, when an upward force is applied to the upper portion of the insert 12, the first connecting portion 13 is torn or broken, such that the portion, above the first connecting portion 13, of the insert 12 is removed. If the first connecting portion 13 is only torn but not completely broken under the force, since both sides of the insert 12 are provided with the bayonets 18, the user can repeat the above operation from the other side until the upper portion of the insert 12 is completely removed.

As shown in FIGS. 6-7, in this embodiment, the pushing and clamping pliers 3 further comprise an elastic member 36, with one end thereof being connected to the first clamping portion 311, and the other end thereof being connected to the second clamping portion 321. Alternatively, one end of the elastic member is connected to the first handheld portion 312, and the other end thereof is connected to the second handheld portion 322. When the first component 31 and the second component 32 of the pushing and clamping pliers 3 are to be relatively closed, the user only needs to use one hand to apply force to the inner side, but when they are to be relatively opened, the user needs to use two hands at the same time, so the operation is inconvenient. With the elastic member 36 mounted between the first component 31 and the second component 32, a certain outward tension can be provided between the first component 31 and the second component 32, such that the user can perform opening and closing operations with one hand.

Preferably, this embodiment further comprises a first guiding post 361 and a second guiding post 362 respectively disposed on two opposite side faces of the two handheld portions 312 and 322. The first guiding post 361 protrudes from the inner side face of the first handheld portion 312. The second guiding post 362 protrudes from the inner side face of the second handheld portion 322, and the second guiding post 362 is disposed opposite the first guiding post 361. The elastic member 36 is preferably a coil spring, with one end thereof being sheathed over the first guiding post 361, and the other end thereof being sheathed over the second guiding post 362. In other variant embodiments, the two guiding posts 361, 362 may be respectively disposed on two opposite side faces of the two clamping portions 311 and 321. The first guiding post 361 protrudes from the inner side face of the first clamping portion 311, the second guiding post 362 protrudes from the inner side face of the second clamping portion 321, and the second guiding post 362 is disposed opposite the first guiding post 361.

Figure 8:
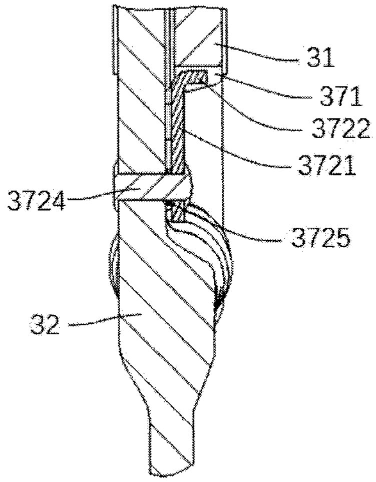
FIG. 8 is a schematic side structural diagram of a locking device according to Embodiment 1 of the present application.

As shown in FIGS. 6-8, in this embodiment, the pushing and clamping pliers 3 further comprise a locking device 37 used to switch the pushing and clamping pliers 37 between opened and closed states including a closed state and an opened state. When the locking device 37 is locked, the pushing and clamping pliers 3 are in the closed state. When the locking device 37 is unlocked, the pushing and clamping pliers 3 are in the opened state.

In this embodiment, the pushing and clamping pliers 3 further comprise a first bent portion 315 and a second bent portion 325, which are both sheathed outside the pivot, such that the second component 32 is hinged to the first component 31 via the pivot 33. The first bent portion 315 is part of the first clamping portion 311, and the second bent portion 325 is part of the second clamping portion 321.

As shown in FIGS. 6-10, the locking device 37 comprises a locking slot 371, a locking member 372, and a blocking block 373. The locking member 372 and the blocking block 373 are respectively disposed at the ends of the two clamping portions and close to the handheld portions.

In this embodiment, preferably, the locking slot 371 is disposed at the outer side wall of the first bent portion 315, and the locking member 372 is rotatably fitted to the surface of the end of the second clamping portion 321 and is disposed opposite the locking slot 371. The blocking block 373 is disposed at the surface of the end of the first clamping portion 311 and is disposed opposite the second bent portion 325. When the pushing and clamping pliers have the maximum opening angle, the blocking block 373 comes into contact with the outer side wall of the second bent portion 325.

As shown in FIG. 8, the locking member 372 comprises a locking member body 3721, a locking engagement block 3722, and a tab 3723. The locking member body 3721 may be a metal sheet, and is rotatably connected to the end of the first clamping portion 311 or the second clamping portion 321 via a second pivot 3724. A gasket 3725 is disposed between the locking member 372 and the first clamping portion 311 or the second clamping portion 321. The locking member 372 and the clamping portion 311, 321 are both made of metal, and the gasket 3725 can assist in the relative rotation of the two, thereby reducing wear between the components. The locking engagement block 3722 protrudes from the front end of the surface of the locking member body 3721. When the locking engagement block 3722 is engaged into the locking slot 371, the locking device 37 is locked. When the locking engagement block 3722 is disengaged from the locking slot 371, the locking device 37 is unlocked. The tab 3723 protrudes from and is perpendicular to the surface of the locking member body 3721. The user can move the tab 3723 with a finger to drive the locking member body 3721 to rotate, such that the locking engagement block 3722 is engaged into or disengaged from the locking slot 371.

When the pushing and clamping pliers 3 need to be adjusted from the closed state to the opened state, the user can first further close the two handheld portions, and then rotate the tab 3723 counterclockwise, such that the locking engagement block 3722 is disengaged from the locking slot 371 and is therefore unlocked, and the two clamping portions are opened under the action of the elastic member 36 (coil spring).

When the pushing and clamping pliers 3 need to be adjusted from the opened state to the closed state, the user can first close the two handheld portions, and then rotate the tab 3723 clockwise, such that the locking engagement block 3722 is engaged into the locking slot 371, and the two clamping portions are therefore locked in the closed state.

Similarly, the locking slot 371 may also be disposed on the outer side wall of the second bent portion 325, and the locking member 372 is rotatably fitted to the surface of the end of the first clamping portion 311 and disposed opposite the locking slot 371. The blocking block 373 is disposed on the surface of the end of the second clamping portion 321 and is disposed opposite the first bent portion 315. When the pushing and clamping pliers have the maximum opening angle, the blocking block 373 comes into contact with the outer side wall of the first bent portion 315.

This embodiment provides a ceramic tile leveling bracket, pushing and clamping pliers, and a ceramic tile leveling and laying system. In the ceramic tile laying process, the ceramic tile leveling bracket and the insertion block are used to support the junction of two adjacent ceramic tiles, such that the upper surfaces of multiple ceramic tiles in the same area are kept in the same plane, the operation is simple and convenient, and the laying efficiency and the leveling quality are effectively improved, thereby facilitating large-scale application.

Embodiment 2

Figure 11:
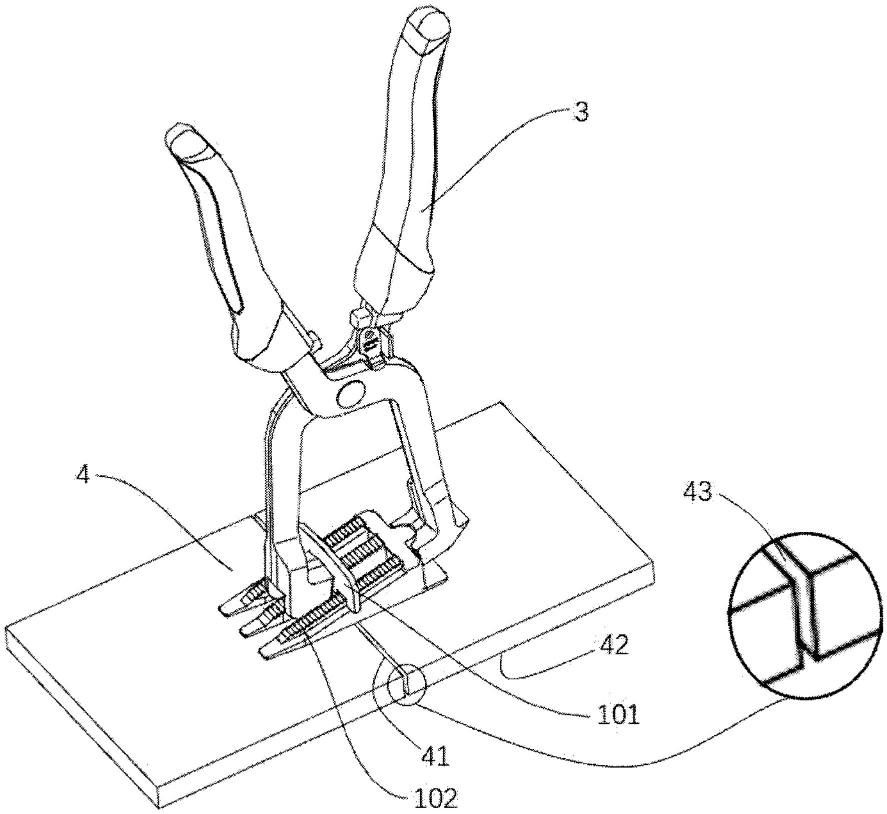
FIG. 11 is a schematic structural diagram of a ceramic tile leveling and laying system in a use state according to Embodiment 2 of the present application.

As shown in FIG. 11, this embodiment provides a ceramic tile leveling and laying system, comprising a second ceramic tile leveling bracket 101, a second insertion block 102, and pushing and clamping pliers 3, which cooperate with one another for assist in leveling of ceramic tiles 4 in the ceramic tile laying process, such that all the upper surfaces of the ceramic tiles lie in the same plane.

During the construction of the ceramic tile laying, a user can apply an adhesive, such as cement and a ceramic tile adhesive, onto a floor or a wall according to requirements, and then multiple ceramic tiles are subsequently laid onto the floor or the wall. During laying, a second ceramic tile leveling bracket 101 is placed at the junction of at least two adjacent ceramic tiles 4, and taking a square ceramic tile as an example, it is necessary to provide a second ceramic tile leveling bracket 101 on each of four sides thereof.

The pushing and clamping pliers 3 used in the present embodiment is the same as that in the embodiment 1.

Figure 12:
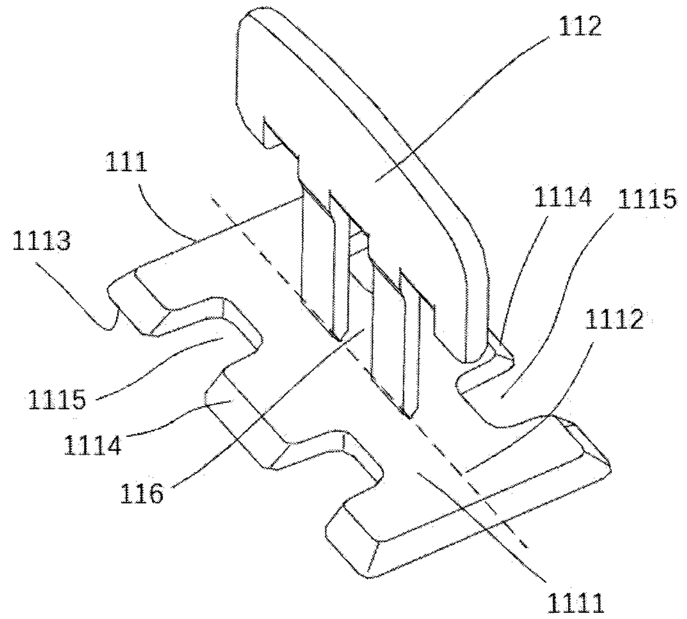
FIG. 12 is a schematic perspective structural diagram of a second ceramic tile leveling bracket according to Embodiment 2 of the present application.

As shown in FIG. 12, the second ceramic tile leveling bracket 101 comprises a second pad 111 and a second insert 112, which are integrally provided. When the second ceramic tile leveling bracket 101 is placed at the junction of at least two adjacent ceramic tiles 4, the upper surface 1111 of the second pad 111 comes into contact with the lower surfaces 42 of the ceramic tiles 4 (see FIG. 16) to support the ceramic tiles 4.

The second insert 112 is disposed on the upper surface 1111 of the second pad 111 and is formed by extends from the upper surface 1111 of the second pad 111 away from the second pad 111, such that the second insert 112 protrudes from the second pad 111. Preferably, the second insert 112 is arranged at the first middle line 1112 of the upper surface 1111 of the second pad 111. The first middle line 1112 refers to a middle line, parallel to the side 41 where the ceramic tiles 4 are adjacent to each other, of the upper surface 1111 of the second pad 111 when the second ceramic tile leveling bracket 101 is placed at the junction of the adjacent ceramic tiles 4. The longitudinal cross-section of the second ceramic tile leveling bracket 101 (i.e., the cross section parallel to the first middle line 1112) is approximately in an inverted T-shape (see FIG. 15). It should be understood that the second insert 112 may not be disposed at the first middle line 1112 of the upper surface 1111 of the second pad 111. For example, the second insert 112 is arranged at other positions, being parallel to or intersecting with the first middle line 1112, on the upper surface 1111 of the second pad 111

When in use, the second pad 111 is disposed below the two adjacent ceramic tiles 4, and the second insert 112 is inserted into the gap between the two adjacent ceramic tiles 4.

The second pad 111 is in the shape of a flat plate, that is, the bottom face 1113 and the upper surface 1111 of the second pad 111 are flat surfaces parallel to each other. The side face, connecting the upper surface 1111 and the bottom face 1113, of the second pad 111 is an inclined surface, and the inclined surface forms an acute angle with the bottom face 1113 of the second pad 111. The two lateral sides 1114, facing the ceramic tiles 4, of the second pad 111 are respectively provided with at least one flow-through portion used to allow the adhesive below the ceramic tiles 4 to enter the space between the upper surface 1111 of the second pad 111 and the lower surface of the ceramic tile 4 via the flow-through portion during the leveling of the ceramic tiles, such that the second pad 111 and the ceramic tile 4 are fixed as a whole during curing of the adhesive. Preferably, the two lateral sides 1114, facing the ceramic tiles 4, of the second pad 111 are respectively provided with two flow-through portions. In some implementations, the flow-through portion is a pad groove 1115 provided in the lateral side 1114 of the second pad 111. The pad groove 1115 penetrates the second pad 111 in the thickness direction of the second pad 111, that is, the pad groove 1115 penetrates from the bottom face 1113 of the second pad 111 to the upper surface 1111 of the second pad 111, and the pad groove 1115 opens toward the ceramic tile 4. In some implementations, a through-hole penetrating the bottom face 1113 and the upper surface 1111 of the second pad 111 may be used instead of the pad groove 1115.

Figure 13:
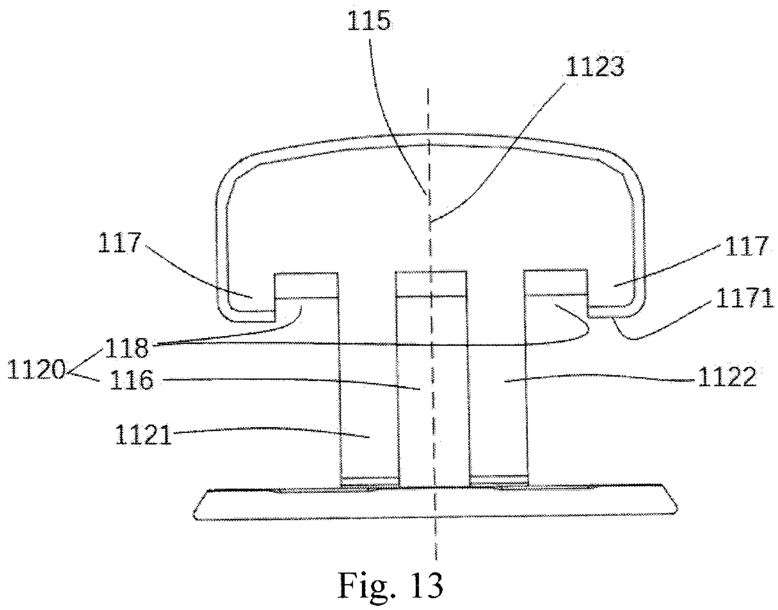
FIG. 13 is a front view of the second ceramic tile leveling bracket according to Embodiment 2 of the present application.

As shown in FIG. 13, the second insert 112 is used to receive the insertion block, and comprises at least one insertion block receiving portion 1120 which is used to receive the insertion block and into which the insertion block is inserted. Preferably, the insertion block receiving portion 1120 comprises a first insertion block receiving portion 116, which is a insertion block through-hole provided in the second insert 112, and/or second insertion block receiving portions 118 provided on at least one side of the second insert 112 in the lengthwise direction thereof. The second insert 112 comprises an extension end 115 away from the second pad 111. The first connection piece 1121 and the second connection piece 1122 are connected to the extension end 115 and the second pad 111, the first connection piece 1121 and the second connection piece 1122 are symmetrical about the center line 1123 of the second insert 112, such that a first insertion block receiving portion 116 located in the middle of the second insert 112 is formed between the first connection piece 1121 and the second connection piece 1122. The first insertion block receiving portion 116 penetrates the second insert 112 in the thickness direction of the second insert 112. The first insertion block receiving portion 116 penetrates toward the second pad 111 and reaches the second pad, and can be used to receive insertion of the insertion block, that is, the lateral side, facing the second pad 111, of the first insertion block receiving portion 116 is flush with the upper surface 1111 of the second pad 111. The first insertion block receiving portion 116 may also be the same through-hole as the insertion block through-hole 16 in Embodiment 1, that is, the lateral side, facing the second pad 111, of the second insertion block through-hole 116 is higher than the upper surface 1111 of the second pad 111.

The second insert 112 further comprises a limiting portion 117, and the limiting portion 117 is formed by two sides, in the lengthwise direction of the second insert 112, of the extension end 115 extending toward the second pad 111 by a certain distance, such that two gaps are formed between the two limiting portions 117 and the corresponding first connection piece 1121 and second connection piece 1122 respectively as the second insertion block receiving portions 118. The second insertion block receiving portions 118 can also be used to receive the insertion block.

Figure 14:
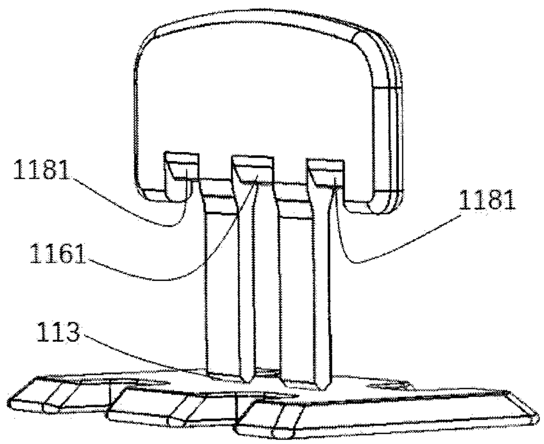
FIG. 14 is a schematic structural diagram of the second ceramic tile leveling bracket according to Embodiment 2 of the present application from another perspective.

Referring to FIG. 14, the upper edge 1161 of the first insertion block receiving portion 116 and the upper edge 1181 of the second insertion block receiving portion 118 are provided to be in the shape of an inclined surface, that is, the thickness of the upper edge 1161 of the first insertion block receiving portion 116 and the upper edge 1181 of the second insertion block receiving portion 118 gradually decreases toward the second pad 111, such that the first insertion block receiving portion 116 and the second insertion block receiving portion 118 cooperates with the insertion block more smoothly.

It should be understood that, in some implementations, the insertion block receiving portion 1120 may only comprise a first insertion block receiving portion 116; in some implementations, the insertion block receiving portion 1120 may only comprise a second insertion block receiving portion 118; and in some implementations, the insertion block receiving portion 1120 may comprise a first insertion block receiving portion 116 and a second insertion block receiving portion 118.

Figure 15:
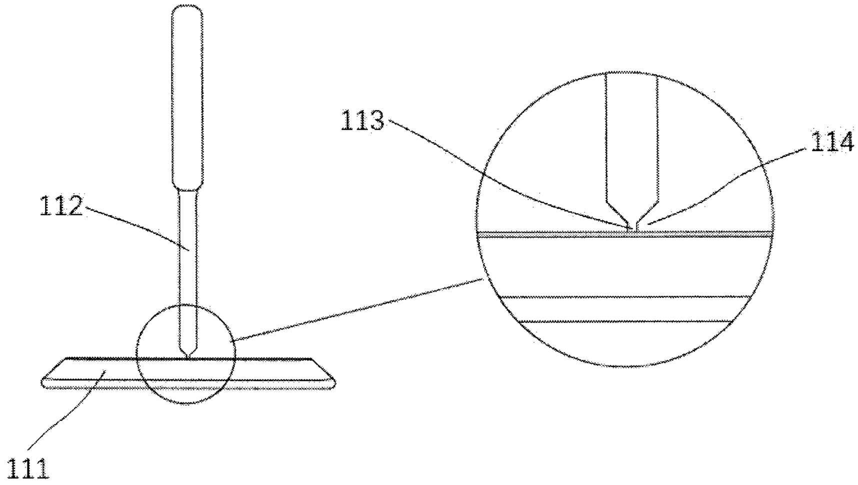
FIG. 15 is a schematic enlarged diagram of a second sheet according to Embodiment 2 of the present application.
Figure 16:
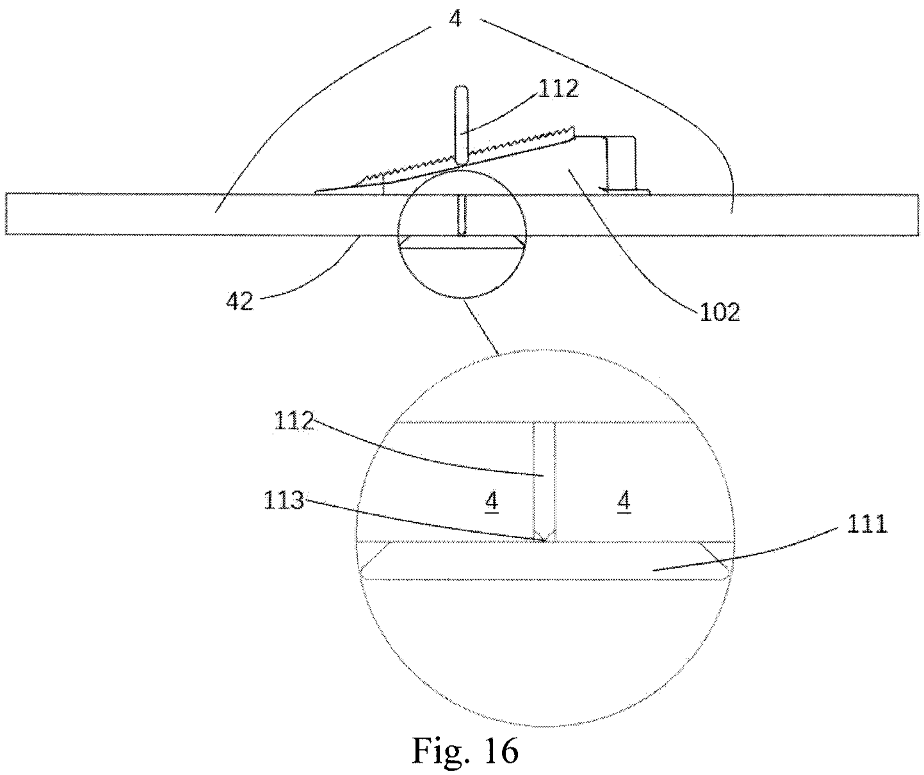
FIG. 16 is a schematic enlarged diagram of the second sheet in use according to Embodiment 2 of the present application.

As shown in FIGS. 15 and 16, the second insert 112 is provided with a second connecting portion 113 close to the second pad 111. The second connecting portion 113 detachably connects the second insert 112 and the second pad 111. The second connecting portion 113 is arranged in the second insert 112 and is part of the second insert 112, and is in the shape of a straight line with a certain width. The second connecting portion is adjacent to the second pad 111, so that height of the second connecting portion 113 after breaking is substantially flush with the lower surface 42 of the ceramic tile 4. The user can apply an external force to break the second connecting portion 113 along the straight line, so that the portion of the second insert 12 above the second connecting portion is separated from the second pad 111 from the position of breaking. The thickness of the second connecting portion 113 is less than the thickness of the second insert, such that a second linear groove 114 is formed on the second insert 112 and inwardly recessed from the second insert 112. The second linear groove 114 may be located on at least one of the sides, facing the ceramic tile 4, of the second insert 112, for example, the second linear groove 114 is only located on one of the sides, facing the ceramic tile 4, of the second insert 112, and the other side, facing the ceramic tile 4, of the second insert 112 is flat; or the second linear groove is located on both sides, facing the ceramic tile 4, of the second insert 112 (see FIG. 16). The bottom of the second linear groove 114 is the second connecting portion 113. With the groove structure provided on one or both sides of the second connecting portion 113, the second connecting portion 113 is relatively thin and has a thickness of generally about 1-2 mm. Such groove structure makes the second connecting portion 113 easy to tear. After the adhesive is cured, the user can violently break or tear the upper portion of the second insert 112 from the second connecting portion 113 with a conventional plier tool.

As shown in FIG. 13, the lower edge 1171, facing the second pad 111, of the limiting portion 117 of the second insert 112 is approximately parallel to the second pad 111, and the user can remove the upper portion of the second insert 112 from the second connecting portion 113, at the lower edge 1171 of the limiting portion 117, with a pulling tool such as a small claw hammer. Specifically, the barbed structure of the pulling tool is used to engage into the lower edge 1171 of the limiting portion 117 to remove the portion, above the second connecting portion 113, of the insert based on the lever principle. Also, the pulling device 35 provided on the pushing and clamping pliers 3 may be used to violently break or tear the upper portion of the second insert 112 from the second connecting portion 113.

Figure 17:
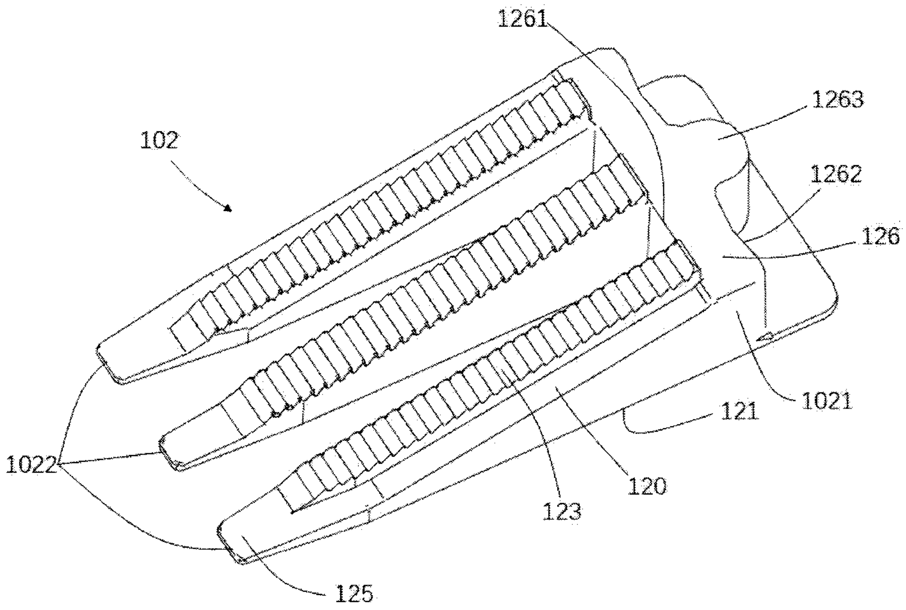
FIG. 17 is a schematic structural diagram of a second insertion block according to Embodiment 2 of the present application.
Figure 18:
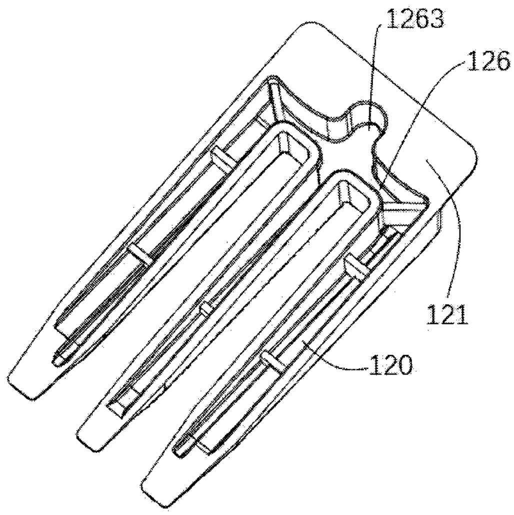
FIG. 18 is a schematic structural diagram of a bottom structure of the second insertion block according to Embodiment 2 of the present application.
Figure 19:
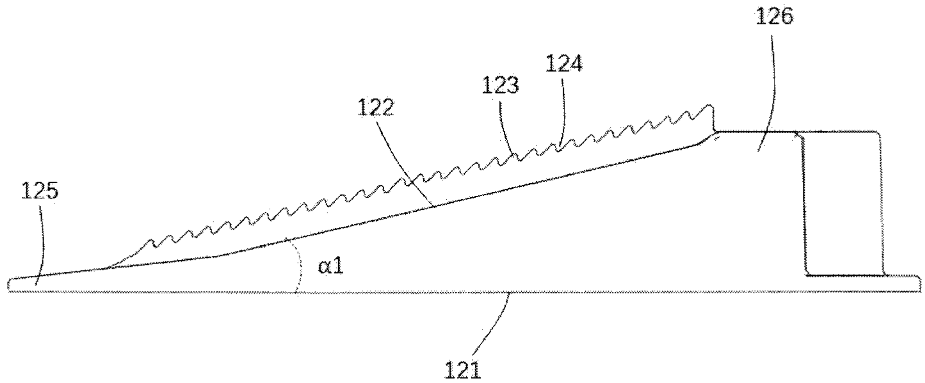
FIG. 19 is a schematic longitudinal structural diagram of the second insertion block according to Embodiment 2 of the present application.

Referring to FIGS. 17 and 18, the longitudinal cross-section of the second insertion block 102 is wedge-shaped, and the second insertion block 102 has a third end 1021 and a fourth end 1022. The height of the third end 1021 relative to the bottom face 121 of the second insertion block 102 is higher than the height of the fourth end 1022 relative to the bottom face 121 of the second insertion block 102. The second insertion block 102 comprises at least one second serration portion 120, with the longitudinal cross-section of the second serration portion 120 also being wedge-shaped. The longitudinal cross-section refers to the cross section perpendicular to the first middle line 1112 of the second pad 111 when the second insertion block 102 is inserted into the second insert 112. The bottom face 121, in contact with the ceramic tile 4, of the second insertion block 102 is a flat surface. One second serration portion 120 comprises a serration portion top face 122, and at least two serrations 123 provided on the serration portion top face 122. The serration portion top face 122 is an inclined face relative to the bottom face 121 of the second insertion block 102, and the included angle $\alpha 1$ between the serration portion top face 122 and the bottom face 121 of the second insertion block 102 is an acute angle such that the serration portion top face 122 and the bottom face 121 of the second insertion block 102 extend to form an acute-angled end portion 125, and the other end of the serration portion top face 122 extends away from the bottom face 121 of the second insertion block 102, such that the second serration portion 120 is wedge-shaped as a whole. At least two serrations 123 are provided o the serration portion top face 122, the multiple serrations 123 are arranged in a straight line along the serration portion top face 122, and a serration slot 124 is formed between the adjacent serrations 123.

The higher third end 1021 of the second insertion block 102 is provided with a base 126, and the second serration portion 120 is disposed on the first side 1261, facing the second insert 112, of the base 126. The second side 1262 of the base 126 opposite the first side 1261 thereof is provided with a second protrusion 1263. The second protrusion 1263 is curved, i.e. the projection of the second protrusion 1263 on the bottom face 121 is an arc. The second protrusion 1263 is located in the middle of the second side 1262 of the base 126 and protrudes outward away from the base 126, and the second protrusion 1263 can cooperate with the first groove 314 of the pushing and clamping pliers 3.

Preferably, as shown in FIG. 18, the bottom of the second insertion block 102 can be arranged as a sunken structure, except that the bottom face 121 used for contact with the upper surface 42 of the ceramic tile 4 is a plat surface, the second serration portion 120, the base 126 and the second protrusion 1263 are all sunken inward from the bottom face 121 to form a sunken structure.

Figure 20:
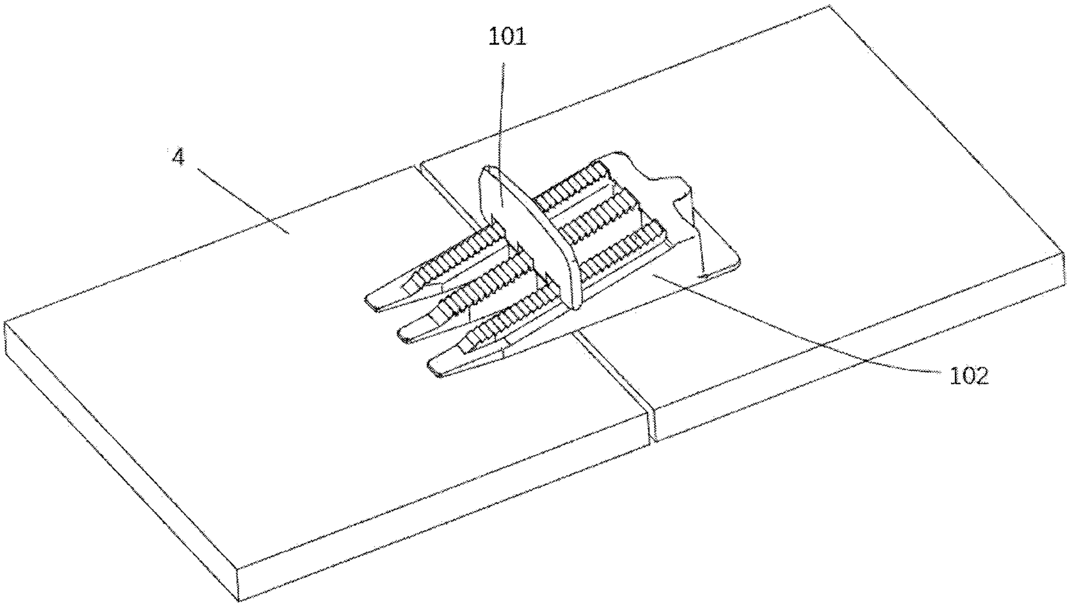
FIG. 20 is a schematic structural diagram of the second insertion block and the second ceramic tile leveling bracket in a use state according to Embodiment 2 of the present application.
Figure 21:
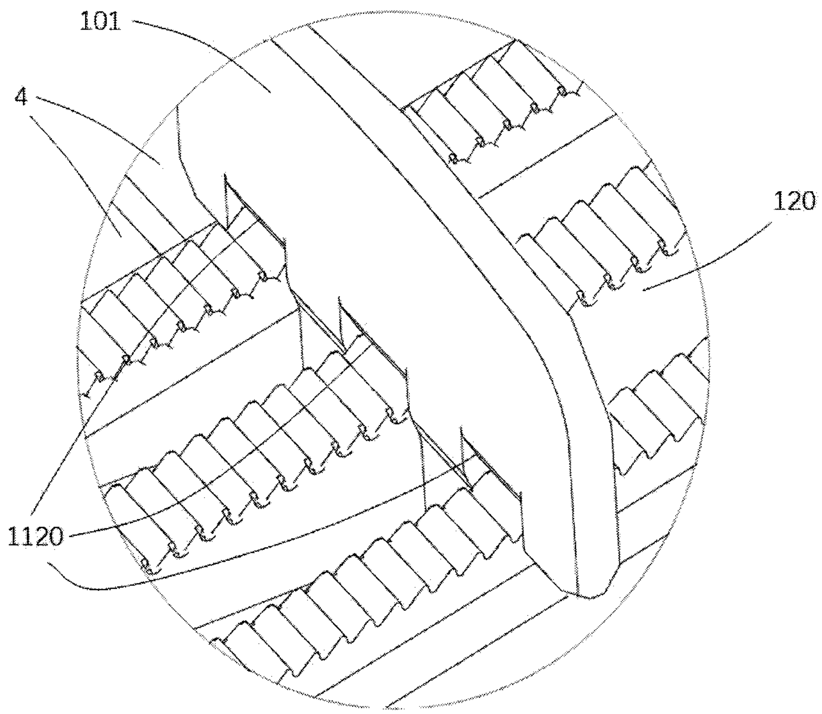
FIG. 21 is a schematic enlarged diagram of the second insertion block and the second ceramic tile leveling bracket in a use state according to Embodiment 2 of the present application.

As shown in FIGS. 20 and 21, when in use, the second ceramic tile leveling bracket 101 is fitted into the gap between the two adjacent ceramic tiles 4, the end portion 125 of the second serration portion 120 of the second insertion block 102 is inserted into the insertion block receiving portion 1120 of the second insert 112, and the user can push the second insertion block 102 as far as possible into the insertion block receiving portion 1120 by means of the pushing and clamping pliers 3, such that the upper edge of the insertion block receiving portion 1120 can be engaged into the serration slot 124 so as to lock the positions of the two ceramic tiles 4. Since the bottom face 121 of the second insertion block 102 is a flat surface, the upper surfaces of the two ceramic tiles 4 are necessarily in the same plane, such that the leveling process of the two ceramic tiles 4 can be completed.

In some implementations, as shown in FIG. 17, the second insertion block 102 comprises three second serration portions 120, and the three serration portions 120 are disposed side by side at intervals, and the end portions 125 of the three second serration portions 120 together form the fourth end 1022 of the second insertion block 102. When the second insert 112 is inserted into the second insertion block 102, the second serration portions 120 on the two sides respectively cooperate with the second insertion block receiving portions 118 on the two sides of the second insert 112; and the second serration portion 120 in the middle cooperates with the first insertion block receiving portion 116. The limiting portion 117 of the second insert 112 can limit the second insertion block 102 to sway from side to side during the movement so as to lock the positions of the two ceramic tiles 4.

In some implementations, the second insertion block 102 comprises two second serration portions 120, and the two serration portions 120 are arranged side by side at an interval and are respectively located on two ends of the first side 1261 of the base 126. When the second insertion block 102 is inserted into the second insert 112, the two second serration portions 120 respectively cooperate with the second insertion block receiving portions 118 on the two sides of the second insert 112. The limiting portion 117 of the second insert 112 can limit the second insertion block 102 to sway from side to side during the movement so as to lock the positions of the two ceramic tiles 4.

In some implementations, the second insertion block 102 comprises one second serration portion 120, and the second serration portion 120 is located in the middle of the base 126. When the second insertion block 102 is inserted into the second insert 112, the second serration portion 120 in the middle of the base 126 cooperates with the first insertion block receiving portion 116 so as to lock the positions of the two ceramic tiles 4.

In addition, the insertion block 2 in Embodiment 1 is also applicable to the second ceramic tile leveling bracket 101 in this embodiment.

The pushing and clamping pliers in this embodiment may be the same as the structure of the pushing and clamping pliers in Embodiment 1, which will not be repeated herein.

Embodiment 3

FIGS. 22-26 illustrate Embodiment 3 in the present application, which discloses a ceramic tile leveling system, comprising a third ceramic tile leveling bracket 201. This embodiment is different from Embodiment 2 in that a first rib 219 is provided on the upper surface 2111, facing the ceramic tile 4, of the third pad 211 of the third ceramic tile leveling bracket 201, and the first rib 219 is disposed at the upper surface of the third pad 211 and located on one side of the third insert 212, and is formed by the upper surface 2111 of the third pad 211 protruding away from the third pad 211. Other features of the third ceramic tile leveling bracket 201 are the same as those of the second ceramic tile leveling bracket 101 in Embodiment 2. The pushing and clamping pliers 3 used in the embodiment 2 can also be applied to the third ceramic tile leveling bracket 201 in the present embodiment.

Figure 22:
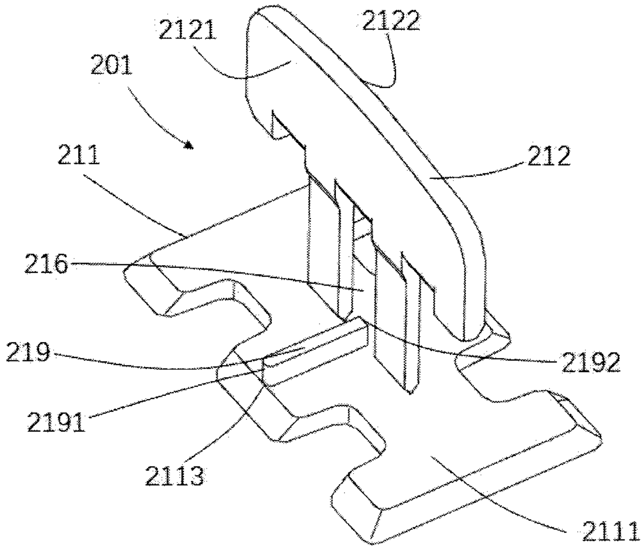
FIG. 22 is a schematic perspective structural diagram of a third ceramic tile leveling bracket according to Embodiment 3 of the present application.
Figure 23:
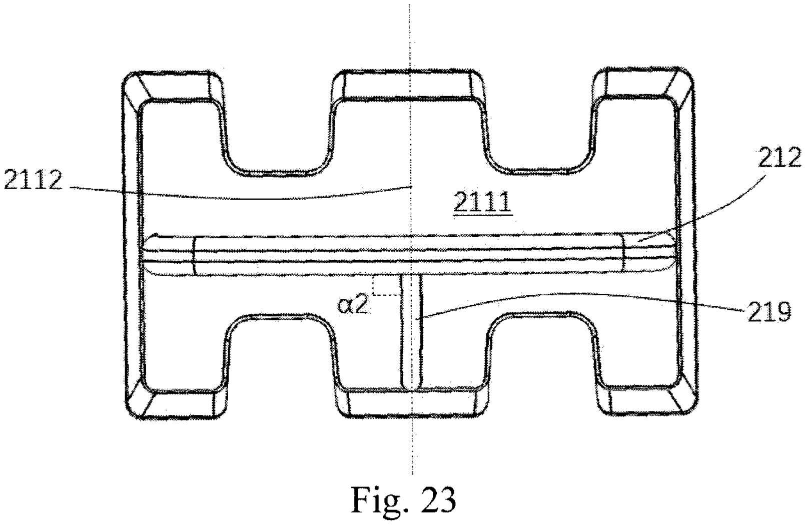
FIG. 23 is a top view of the third ceramic tile leveling bracket according to Embodiment 3 of the present application.

As shown in FIGS. 22 and 23, the first rib 219 is an independent part separated from the third insert 212 and is not parallel to the third insert 212, i.e. the first rib 219 can form an angle α2 with the projection of the third insert 212 on the upper surface 2111 of the third pad 211. In the present embodiment, the angle α2 is 90 degree.

The first rib 219 is perpendicular to the third insert 212 and is located between the outer edge 2113 of the third pad 211 and the third insert 212. Preferably, the first rib 219 is located at the second middle line 2112 of the upper surface 2111 of the third pad 211, and the second middle line 2112 refers to a middle line, perpendicular to the third insert 212, of the upper surface of the third pad 211. It should be understood that, as shown, the first rib 219 can also be arranged at other positions parallel to the second middle line 2112. The first end 2191 of the first rib 219 does not exceed the outer edge 2113 of the third pad 211, and preferably, the first end 2191 of the first rib 219 stops at the outer edge 2113 of the third pad 211 and is flush with the outer edge 2113 of the third pad 211. The third insert 212 has a first face 2121 facing to the first rib 219, and a second face 2122 opposite the first face 2121. The second end 2192 of the first rib does not exceed the second face 2122 of the third insert 212, and preferably stops at the position where the third insert 212 is located on the third pad 211 and stops at the third insertion block through-hole 216.

Figure 25:
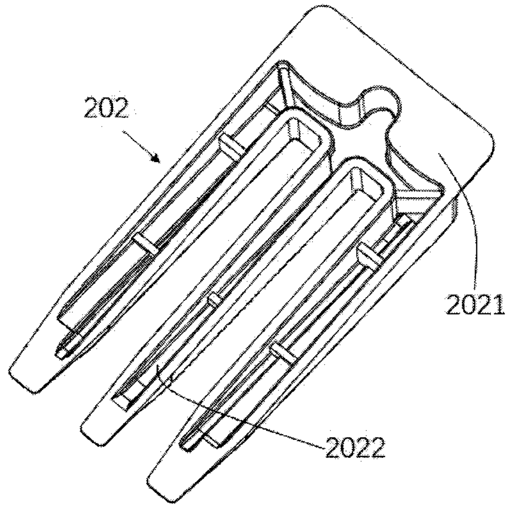
FIG. 25 is a schematic structural diagram of a bottom structure of the third insertion block according to Embodiment 3 of the present application.

As shown in FIG. 25, the third insertion block 202 is also provided in this embodiment in order that the bottom face of the insertion block can be kept tangent to the upper surface of the ceramic tile 4 when the insertion block is inserted into the third insert 212 without being affected by the first rib 219. The third insertion block 212 differs from the second insertion block 102 in embodiment 2 only in that a strip groove 2022 is provided in the bottom surface 2021 of the third insertion block 202. When the third insertion block 202 is inserted into the third insert 212, the strip groove 2022 can receive the first rib 219, i.e. the first rib 219 can be inserted into the strip groove 2022, so that the bottom surface 2021 of the third insertion block 202 can keep tangent to the upper surface of the ceramic tile 4. It should be understood that the insertion block 2 in the embodiment 1 can also be used in the present embodiment by setting a strip groove on the serration portion bottom face 21 of the insertion block 2.

Figure 24:
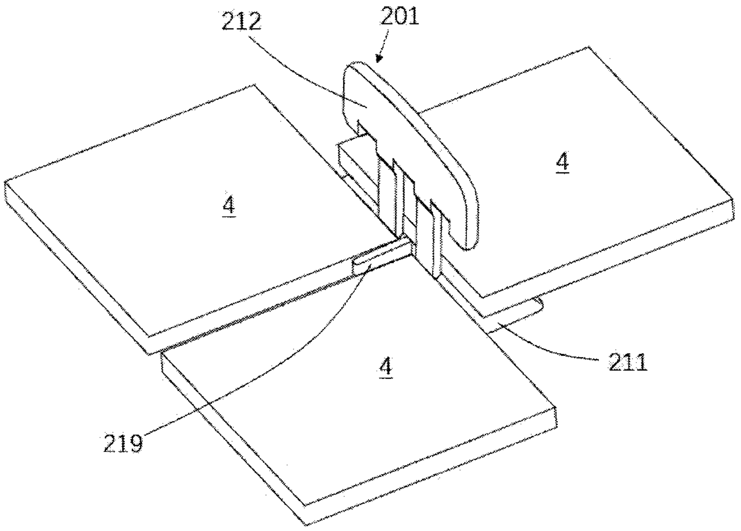
FIG. 24 is a schematic structural diagram of the third ceramic tile leveling bracket in use according to Embodiment 3 of the present application.
Figure 26:
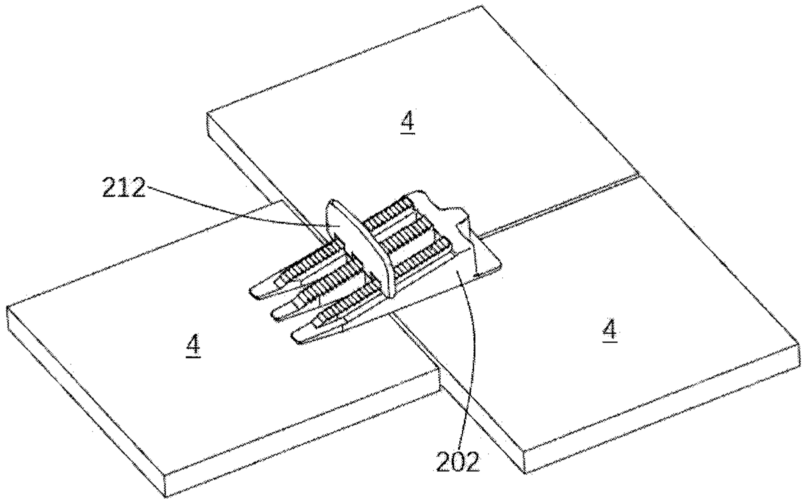
FIG. 26 is a schematic structural diagram of the third ceramic tile leveling bracket and an insertion block in a use state according to Embodiment 3 of the present application.
Figure 27:
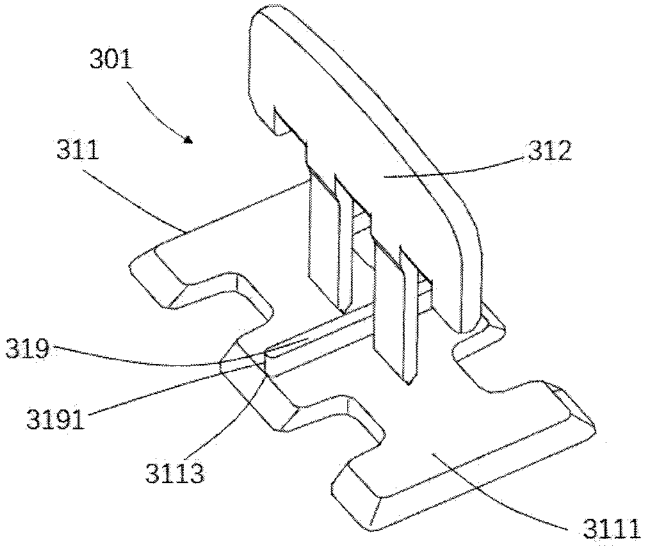
FIG. 27 is a schematic perspective structural diagram of a fourth ceramic tile leveling bracket according to Embodiment 4 of the present application.
Figure 28:
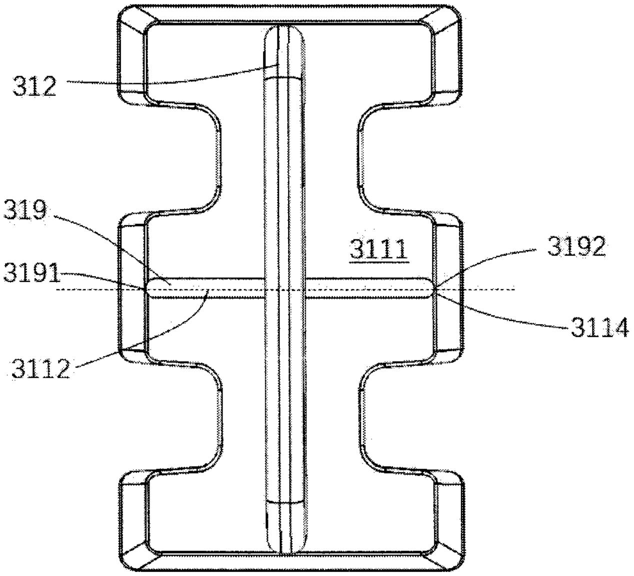
FIG. 28 is a top view of the fourth ceramic tile leveling bracket according to Embodiment 4 of the present application.
Figure 29:
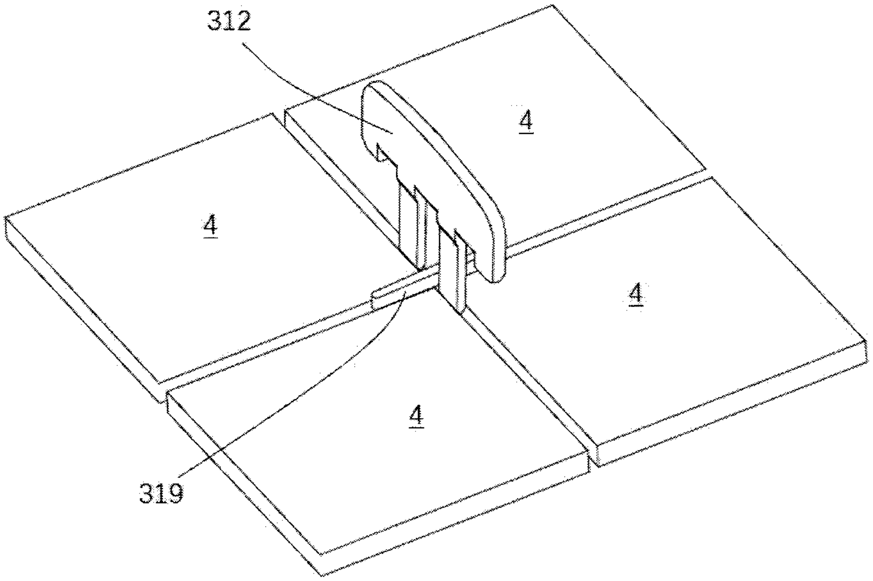
FIG. 29 is a schematic structural diagram of fourth ceramic tile leveling bracket in use according to Embodiment 4 of the present application.
Figure 30:
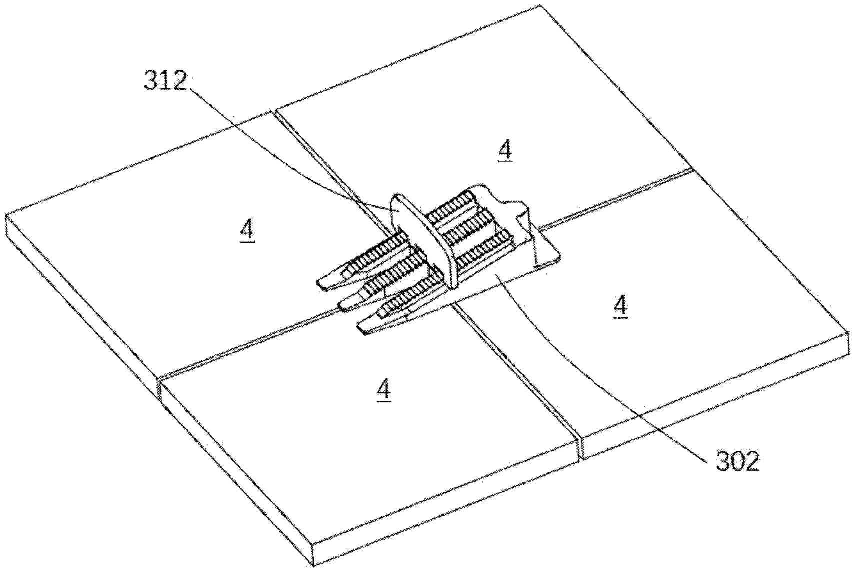
FIG. 30 is a schematic structural diagram of the fourth ceramic tile leveling bracket and an insertion block in a use state according to Embodiment 4 of the present application.

When in use, as shown in FIG. 24, a third ceramic tile leveling bracket 201 is placed at the junction of any three adjacent ceramic tiles 4, in which two ceramic tiles are located one side of the third insert 212 facing the first rib 219, the two ceramic tiles are respectively located on the two sides of the first rib 219, and the other ceramic tile is located on the side of the third insert 212 facing away from the first rib 219. As shown in FIG. 26, then, the third insertion block 202 is inserted into the third insert 212. The third insertion block 202 is pushed as far as possible into the third insert 212 by means of the pushing and clamping pliers 3, such that the third insert 212 can be engaged into the serration slots so as to lock the positions of the three ceramic tiles 4. Since the bottom face of the third insertion block 202 is a flat surface, the upper surfaces of the three ceramic tiles 4 are necessarily located on the same plane, such that the leveling process of the three ceramic tiles 4 can be completed.

Embodiment 4

FIGS. 27-30 illustrate Embodiment 4 in the present application, which discloses a ceramic tile leveling system, comprising fourth ceramic tile leveling bracket 301, and which is different from Embodiment 3 in that the upper surface 3111 of the fourth pad 311 of the fourth ceramic tile leveling bracket 301 is provided with a second rib 319, and the second rib 319 is perpendicular to the fourth insert 312, and the second rib 319 is arranged on the two sides of the fourth insert 312. The other technical features of the fourth ceramic tile leveling bracket 301 are the same as those of the third ceramic tile leveling bracket 201 in Embodiment 3. Preferably, the second rib 319 is located at the third middle line 3112 of the upper surface 3111 of the fourth pad 311, and the third middle line 3112 refers to a middle line, perpendicular to the fourth insert 312, of the upper surface 3111 of the fourth pad 311. The first end 3191 of the second rib 319 does not exceed the first outer edge 3113 of the fourth pad 311, and preferably stops at the first outer edge 3113 and is flush with the first outer edge 3113; and the second end 3192 of the second rib 319 does not exceed the second outer edge 3114, opposite the first outer edge 3113, of the fourth pad 311, and preferably stops at the second outer edge 3114 and is flush with the second outer edge 3114.

The structure of the fourth insertion block 302 used in the present embodiment is the same as the third insertion block 202 in the embodiment 3 and will not be repeated here.

When in use, a fourth ceramic tile leveling bracket 301 is placed at the junction of four adjacent ceramic tiles 4, in which two ceramic tiles 4 are located on one side of the fourth insert 312 facing the first outer edge 3113, the two ceramic tiles 4 are respectively located on two sides of the second rib 319, and the other two ceramic tiles 4 are located on one side of the fourth insert 312 facing the second outer edge 3114 and are respectively located on the two sides of the second rib 319. Then, the fourth insertion block 302 is inserted into the fourth insert 312. The fourth insertion block 302 is pushed as far as possible into the fourth insert 312 by means of the pushing and clamping pliers 3, such that the fourth insert 312 can be engaged into the serration slots so as to lock the positions of the four ceramic tiles 4. Since the bottom face of the fourth insertion block 302 is a flat surface, the upper surfaces of the four ceramic tiles 4 are necessarily located on the same plane, such that the leveling process of the four ceramic tiles 4 can be completed.

Embodiment 5

Figure 31:
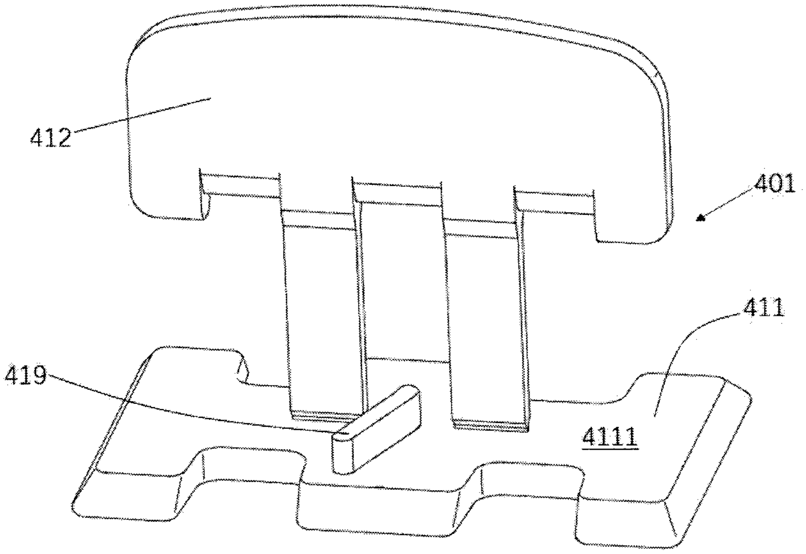
FIG. 31 is a schematic perspective structural diagram of a fifth ceramic tile leveling bracket according to Embodiment 5 of the present application.
Figure 32:
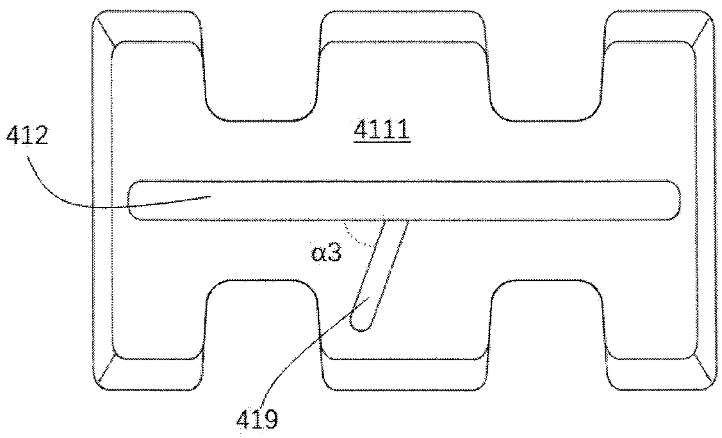
FIG. 32 is a top view of the fifth ceramic tile leveling bracket according to Embodiment 5 of the present application.
Figure 33:
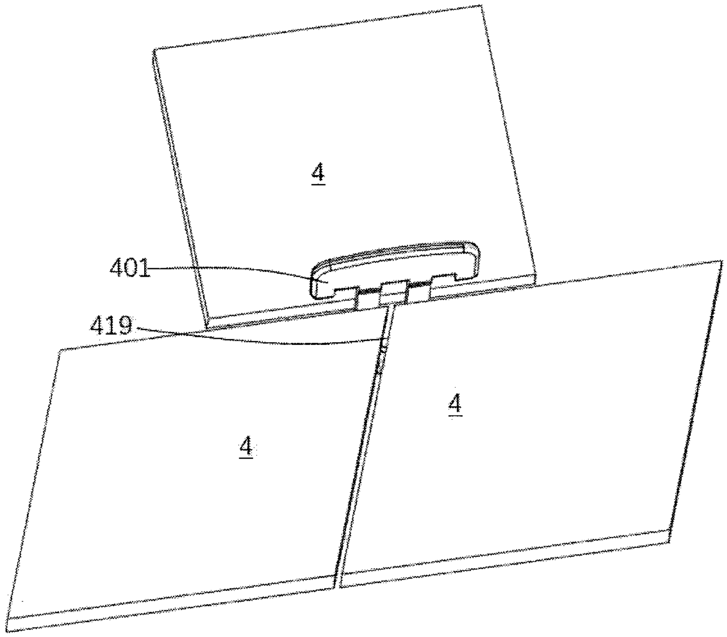
FIG. 33 is a schematic structural diagram of the fifth ceramic tile leveling bracket in a use state according to Embodiment 5 of the present application.

FIGS. 31-33 illustrate Embodiment 5 of the application and disclose a ceramic tile leveling and laying system, comprising the fifth ceramic tile leveling bracket 401, which differs from that in the embodiment 3 only that the third rib 419 is no longer perpendicular to the fifth insert 412, but is at an acute angle to the fifth insert 412. The third rib 419 is provided on the upper surface 4111 of the fifth pad 411 facing the ceramic tile 4. The third rib 419 is formed by the upper surface 4111 of the fifth pad 411 protruding away from the fifth pad 411. The third rib 419 is not perpendicular to the fifth insert 412, but is at an acute angle to the projection of the fifth insert 412 on the upper surface 4111 of the fifth pad 411. The other features of the fifth ceramic tile leveling bracket 401 is the same as the third ceramic tile leveling bracket 201 in the embodiment 3. The pushing and clamping pliers 3 used in the embodiment 2 can also be applied to the fifth ceramic tile leveling bracket 401 in the present embodiment.

The third rib 419 is an independent part separated from the fifth insert 412 and is not parallel to the fifth insert 412, i.e. the third rib 419 can form an angle $\alpha 3$ with the projection of the fifth insert 412 on the upper surface 4111 of the fifth pad 411. In the present embodiment, the angle $\alpha 3$ is less than 90 degree.

The structure of the insertion block used in the present embodiment is similar with the third insertion block 202 in the embodiment 3 except that a strip groove on the bottom of the insertion block is adapted to the third rib 419, and will not be repeated here.

When in use, as shown in FIG. 33, a fifth ceramic tile leveling bracket 401 is placed at the junction of three adjacent ceramic tiles 4, in which the shape of the two ceramic tile 4 located at the third rib 419 are not rectangular or square, but parallelogram, and the two ceramic tiles 4 are located on the two sides of the third rib 419 respectively, and the other ceramic tile is located on the side of the fifth insert 412 away from the third rib 419. Then, the insertion block is inserted into the fifth insert 412. The insertion block is pushed as far as possible into the fifth insert 412 by means of the pushing and clamping pliers 3, such that the fifth insert 412 can be engaged into the serration slots so as to lock the positions of the three ceramic tiles 4. Since the bottom face of the insertion block is a flat surface, the upper surfaces of the three ceramic tiles 4 are necessarily located on the same plane, such that the leveling process of the three ceramic tiles 4 can be completed.

Embodiment 6

Figure 34:
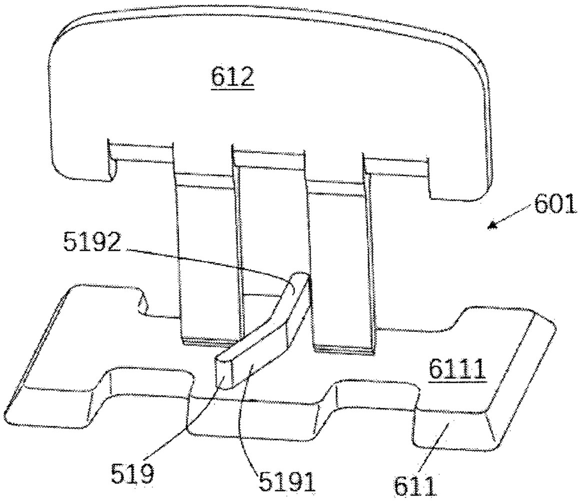
FIG. 34 is a schematic perspective structural diagram of a sixth ceramic tile leveling bracket according to Embodiment 6 of the present application.
Figure 35:
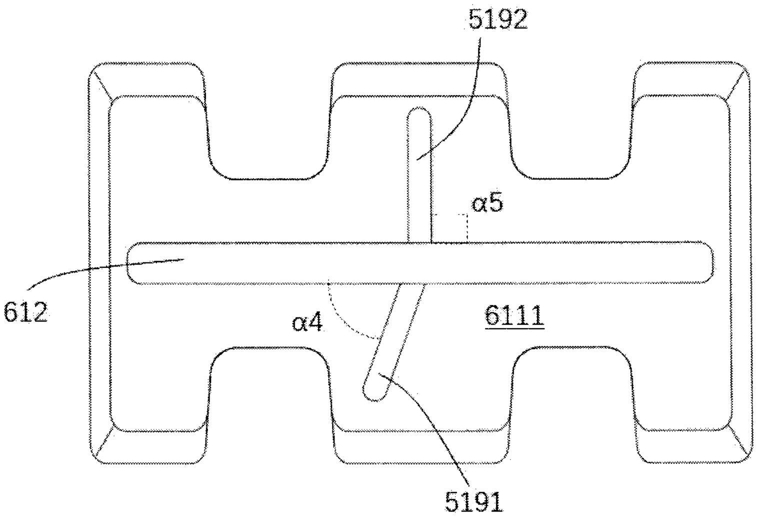
FIG. 35 is a top view of the sixth ceramic tile leveling bracket according to Embodiment 6 of the present application.
Figure 36:
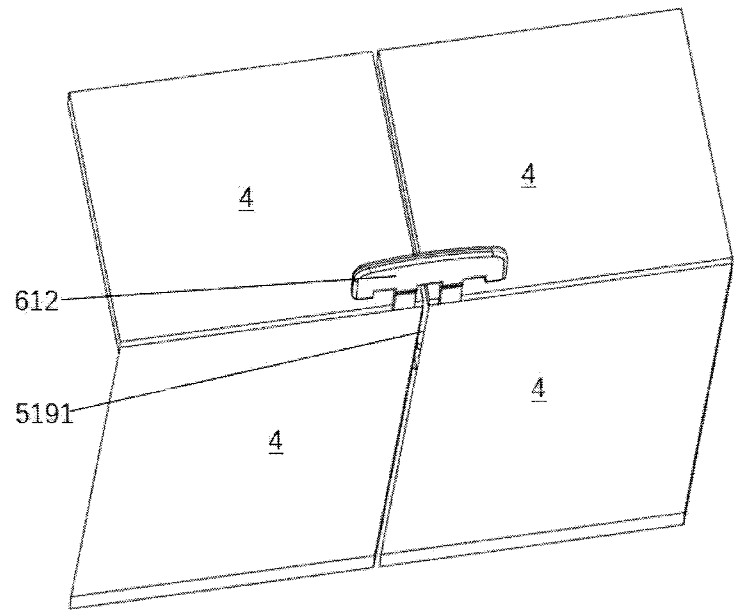
FIG. 36 is a schematic structural diagram of the sixth ceramic tile leveling bracket in a use state according to Embodiment 6 of the present application.

FIGS. 34-36 illustrate Embodiment 6 of the application and disclose a ceramic tile leveling and laying system, comprising the sixth ceramic tile leveling bracket 601, which differs from that in the embodiment 4 only that only part of the fourth rib 519 is perpendicular to the sixth insert 612, and the other part is at an acute angle to the sixth insert 612. As shown in FIGS. 34 and 35, the fourth rib 519 is provided on the upper surface 6111 of the sixth pad 611 facing the ceramic tile 4. The fourth rib 519 is formed by the upper surface 6111 of the sixth pad 611 protruding away from the sixth pad 611. The fourth rib 519 is divided into two portions, the first portion 5191 being located on one side of the sixth insert 612, which forms an acute angle $\alpha 4$ with the projection of the sixth insert 612 on the upper surface 6111, and the second portion 5192 is perpendicular to the sixth insert 612 to form a right angle $\alpha 5$. The other features of the sixth ceramic tile leveling bracket 601 is the same as the fourth ceramic tile leveling bracket 301 in the embodiment 4. The pushing and clamping pliers 3 used in the embodiment 2 can also be applied to the sixth ceramic tile leveling bracket 601 in the present embodiment.

The structure of the insertion block used in the present embodiment is the same as the third insertion block 202 in the embodiment 3 and will not be repeated here.

When in use, as shown, a sixth ceramic tile leveling bracket 601 is placed at the junction of four adjacent ceramic tiles 4, in which the shape of the two ceramic tile 4 located at the two sides of the first portion 5191 of the fourth rib 519 are not rectangular or square, but parallelogram, and the two other ceramic tiles located at the two sides of the second portion 5192 of the fourth rib 519 are rectangle or square. Then, the insertion block is inserted into the sixth insert 612. The insertion block is pushed as far as possible into the sixth insert 612 by means of the pushing and clamping pliers 3, such that the sixth insert 612 can be engaged into the serration slots so as to lock the positions of the four ceramic tiles 4. Since the bottom face of the insertion block is a flat surface, the upper surfaces of the four ceramic tiles 4 are necessarily located on the same plane, such that the leveling process of the four ceramic tiles 4 can be completed.

It should be understood that the second portion 5192 of the fourth rib 519 can also be arranged at an acute angle to the sixth insert 612 for using in the leveling process of four parallelogram ceramic tiles 4.

Embodiment 7

Figure 37:
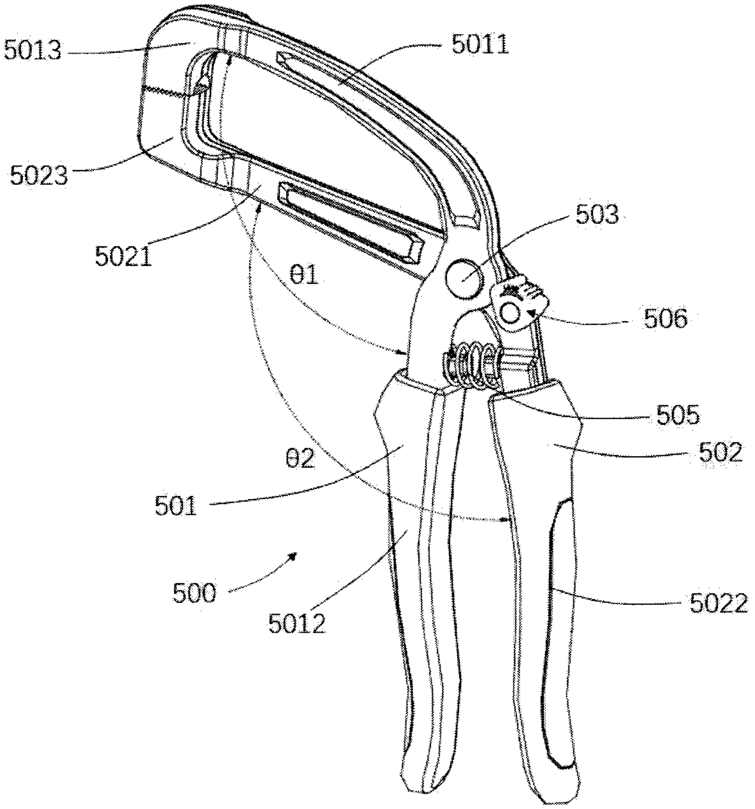
FIG. 37 is a schematic structural diagram of second pushing and clamping pliers according to Embodiment 7 of the present application.

FIGS. 37-46 illustrate Embodiment 7 in the present application. As shown in FIG. 37, this embodiment discloses second pushing and clamping pliers 500 for the ceramic tile leveling system, the second pushing and clamping pliers comprising a third component 501, a fourth component 502, and a third pivot 503. The third component 501 comprises a third clamping portion 5011 and a third handheld portion 5012, and the fourth component 502 comprises a fourth clamping portion 5021 and a fourth handheld portion 5022, wherein the fourth clamping portion 5021 is rotatably connected to the third clamping portion 5011 via the third pivot 503. The third clamping portion 5011 is provided with a third clamping block 5013 at the top end away from the third handheld portion 5012, the fourth clamping portion 5021 is provided with a fourth clamping block 5023 at the top end away from the fourth handheld portion 5022, the third clamping block 5013 is disposed opposite the fourth clamping block 5023, and the third clamping block 5013 and the fourth clamping block 5023 are approximately in the same plane. The third clamping portion 5011 extends and bends in a first direction X from the third handheld portion 5012, and forms an obtuse angle with the third handheld portion 5012, with the angle being θ1, 155°≤θ1≤160°. The fourth clamping portion 5021 extends and bends in a second direction Y from the fourth handheld portion 5022, and forms an obtuse angle with the fourth handheld portion 5022, with the angle being θ2, 155°≤θ2≤160°. The fourth clamping portion 5021 bends toward the same side as the third clamping portion 5011, i.e. the first direction X and the second direction Y are located in the same side of the third handheld portion 5012 and the fourth handheld portion 5022.

The second pushing and clamping pliers 500 can cooperate with the ceramic tile leveling bracket and the insertion block in Embodiment 1, Embodiment 2, Embodiment 3, Embodiment 4, Embodiment 5 and Embodiment 6 to apply a pushing and clamping force so as to lock the positions of the ceramic tiles 4, thereby completing the leveling process of the ceramic tile 4. Compared with the pushing and clamping pliers 3 in the embodiments described above, the second pushing and clamping pliers 500 is more convenient to operate: when the pushing and clamping pliers 3 in the embodiments described above are used, since the handheld portion of the pushing and clamping pliers 3 vertically faces upward, the user needs to turn his hand over to operate, thereby consuming more physical strength and being easily fatigue. However, in this embodiment, the clamping portion is bent, such that when the second pushing and clamping pliers 500 is used, the handheld portion is substantially in a horizontal position, such that the user can operate without turning the hand, which is conducive to saving physical strength.

Figure 38:
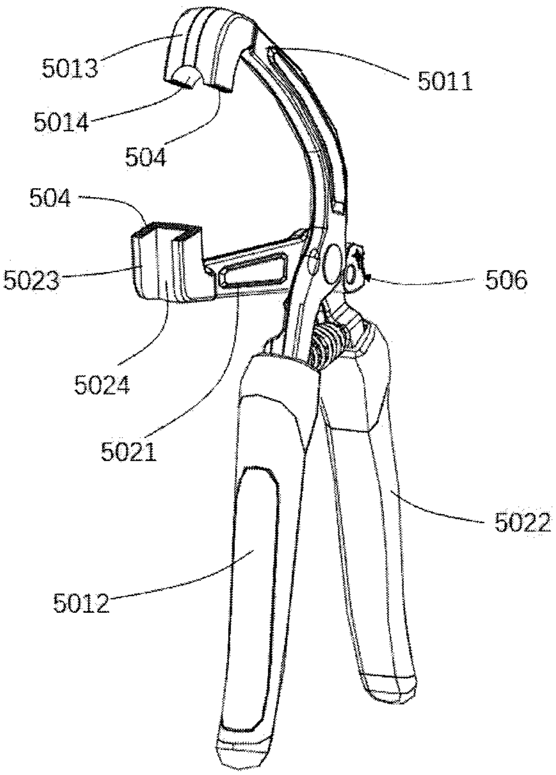
FIG. 38 is a schematic structural diagram of the second pushing and clamping pliers according to Embodiment 7 of the present application from another perspective.

As shown in FIG. 38, the inner side faces opposite each other of the third clamping block 5013 and the fourth clamping block 5023 may be provided with second clamping teeth 504. The second clamping teeth 504 is arranged on the side face, facing the fourth clamping block 5023, of the third clamping block 5013, that is, the second clamping teeth 504 of the third clamping block 5013 is disposed opposite the fourth clamping block 5023. The second clamping teeth 504 may also be disposed on the side face, facing the third clamping block 5013, of the fourth clamping block 5023, that is, the second clamping teeth 504 of the fourth clamping block 5023 is disposed opposite the third clamping block 5013. In other words, the second clamping teeth 504 of the third clamping block 5013 are disposed opposite the second clamping teeth 504 of the fourth clamping block 5023, the inner side faces opposite each other of the two clamping blocks are clamping faces opposite each other, and the second clamping teeth 504 can increase the coefficient of friction between the clamping faces and the surface of the clamped object, thereby preventing the clamped object from slipping out.

Figure 44:
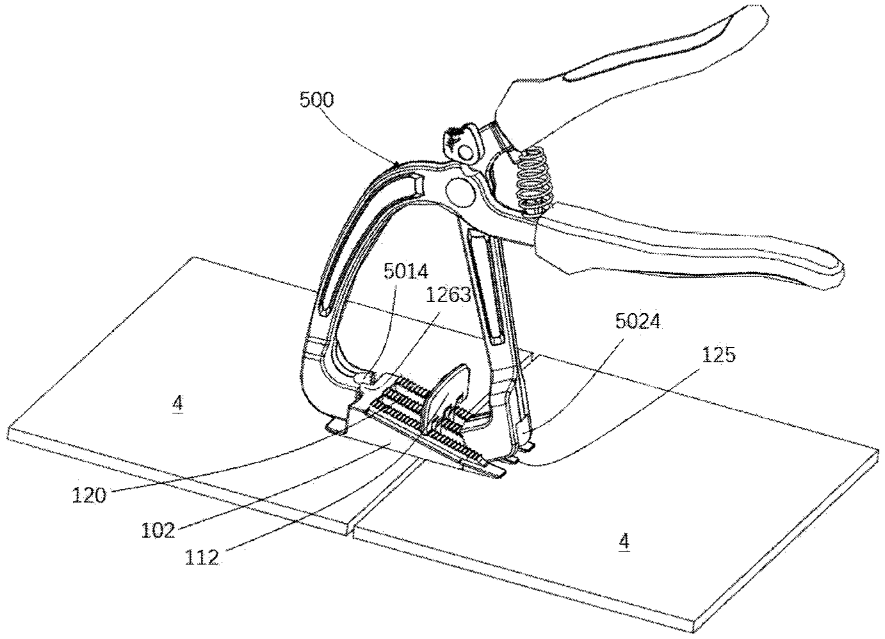
FIG. 44 is a schematic structural diagram of the second pushing and clamping pliers in a use state according to Embodiment 7 of the present application.

As shown in FIG. 38, the inner side wall of the clamping face of the third clamping block 5013 is provided with an inwardly recessed second third groove 5014, with the direction of opening thereof facing the fourth clamping portion 5021; and the fourth clamping block 5023 is provided with a fourth groove 5024 that penetrates the fourth clamping block 5023 toward the third clamping block 5013, and the fourth groove 5024 and the third groove 5014 are disposed opposite each other and in the same straight line. Portions, on the two sides and at the bottom of the clamping through-groove, of the fourth clamping block 5023 form a bifurcated structure comprising two bifurcated portions, the fourth groove 5024 is located between the two bifurcated portions, and the second clamping teeth 504 of the fourth clamping portion 5021 are provided on the clamping faces on the inner sides of the two bifurcated portions. The fourth groove 5024 and the third groove 5014 are configured to match with the insertion block such that the insertion block is pushed and clamped into the ceramic tile leveling bracket so as to achieve leveling of the ceramic tiles 4, wherein the insertion block and the ceramic tile leveling bracket may be the insertion block and the ceramic tile leveling bracket in any one of Embodiments 1-6. Here, the second insertion block 102 and the second ceramic tile leveling bracket 101 in Embodiment 2 are described as an example. As shown in FIG. 44, when in use, the third groove 5014 cooperates with the second protrusion 1263 of the second insertion block 102, and is located on one side of the second insert 112 of the second ceramic tile leveling bracket 101; and the fourth groove 5024 is located on the other opposite side of the second insert 112, and the end portion 125 of the serration portion 120 is enabled to slide in the fourth groove 5024 such that the second insertion block 102 is secured in the insertion block receiving portion 1120 so as to lock the positions of the ceramic tiles 4.

Figure 39:
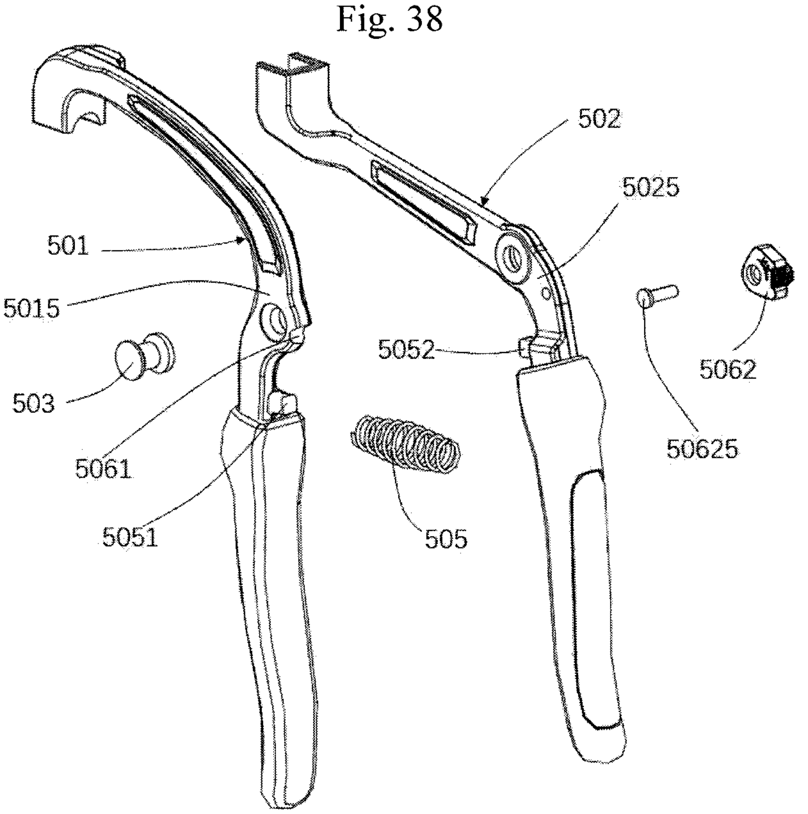
FIG. 39 is a schematic exploded diagram of the second pushing and clamping pliers according to Embodiment 7 of the present application.

As shown in FIGS. 37 and 39, the second pushing and clamping pliers 500 further comprises a second elastic member 505, with one end thereof being connected to the third clamping portion 5011, and the other end thereof being connected to the fourth clamping portion 5021; or with one end thereof being connected to the third handheld portion 5012, and the other end thereof being connected to the third handheld portion 5012. When the third component 501 and the fourth component 502 of the second pushing and clamping pliers 500 are to be relatively closed, the user only needs to use one hand to apply force to the inner side, but when they are to be relatively opened, the user needs to use two hands at the same time, so the operation is inconvenient. With the second elastic member 505 mounted between the third component 501 and the fourth component 502, and a certain outward tension can be provided between the third component 501 and the fourth component 502, which causes the third component 501 and the fourth component 502 to move in the opening direction, such that the user can perform opening and closing operations with one hand. The second pushing and clamping pliers 500 further comprises a third guiding post 5051 and a fourth guiding post 5052 respectively disposed at two opposite side faces of the two handheld portions. The third guiding post 5051 protrudes from the inner side face of the third handheld portion 5012; and the fourth guiding post 5052 protrudes from the inner side face of the fourth handheld portion 5022, and the fourth guiding post 5052 is disposed opposite the third guiding post 5051. The second elastic member 505 is a coil spring, with one end thereof being sheathed over the third guiding post 5051, and the other end thereof being sheathed over the fourth guiding post 5052. In other variant embodiments, the two guiding posts may be respectively disposed on two opposite side faces of the two clamping portions. The third guiding post 5051 protrudes from the inner side face of the third clamping portion 5011, the fourth guiding post 5052 protrudes from the inner side face of the fourth clamping portion 5021, and the third guiding post 5051 is disposed opposite the fourth guiding post 5052.

As shown in FIG. 37, the second pushing and clamping pliers 500 further comprise a second locking device 506 used to switch the second pushing and clamping pliers 500 between opened and closed states including a closed state and an opened state. When the second locking device 506 is locked, the elastic force of the second elastic member 505 is overcome so that the second pushing and clamping pliers 500 are in the closed state. When the second locking device 506 is unlocked, the second pushing and clamping pliers 500 are in the opened state under the action of the elastic force of the second elastic member 505.

As shown in FIG. 39, the second pushing and clamping pliers 500 further comprise a third bent portion 5015 and a fourth bent portion 5025, which are both sheathed outside the third pivot 503, such that the fourth component 502 is hinged to the third component 501 via the third pivot 503. The third bent portion 5015 is part of the third clamping portion 5011, and the fourth bent portion 5025 is part of the fourth clamping portion 5021. The second locking device 506 comprises a second locking slot 5061, a second locking member 5062, and a second blocking block 507 (see FIG. 43). The second locking member 5062 is disposed at the ends of the two clamping portions and close to the handheld portion. The second locking slot 5061 is disposed one of the third clamping portion 5011 and the fourth clamping portion 5021, and the second locking slot 5061 is located on the outer side wall of the bent portion of the clamping portion where the second locking slot is located. The second locking member 5062 is rotatably connected to the other of the third clamping portion 5011 and the fourth clamping portion 5021 and is disposed opposite the second locking slot 5061. The second blocking block 507 is disposed on the same clamping portion as the second locking slot 5061, and is disposed opposite the bent portion of the other clamping portion. Here, description is made in detail taking an example in which the second locking slot 5061 is disposed on the third bent portion 5015 of the third clamping portion 5011, the second locking member 5062 is connected to the fourth clamping portion 5021, and the second blocking block 507 is disposed on the third clamping portion 5011.

Figure 40:
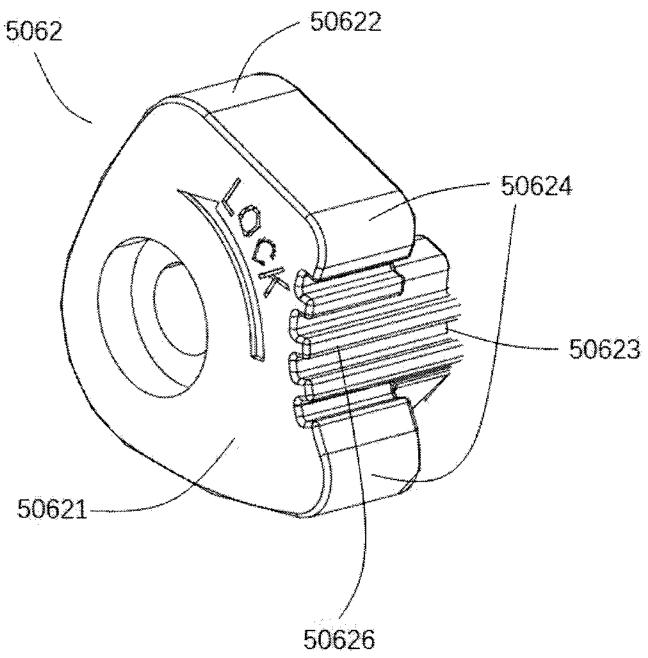
FIG. 40 is a schematic structural diagram of a second locking member body according to Embodiment 7 of the present application.
Figure 41:
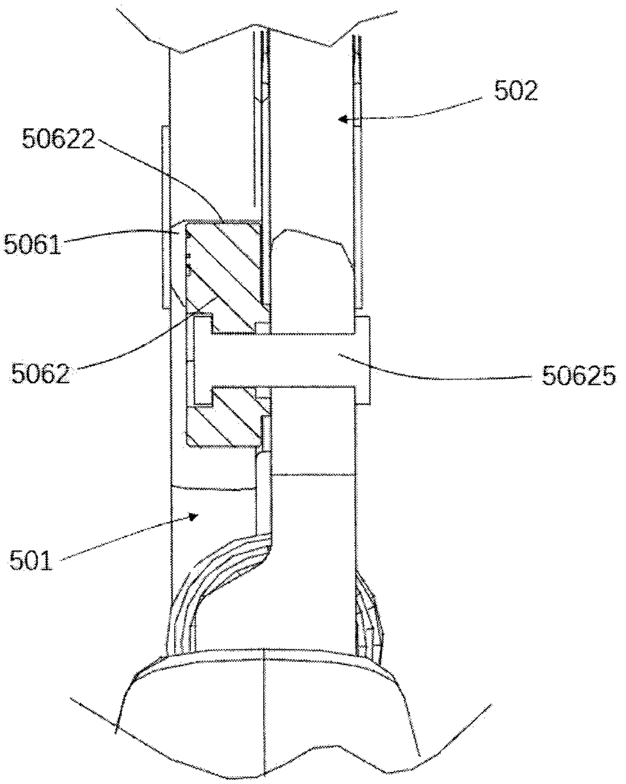
FIG. 41 is a schematic cross-sectional diagram of a second locking device according to Embodiment 7 of the present application.
Figure 42:
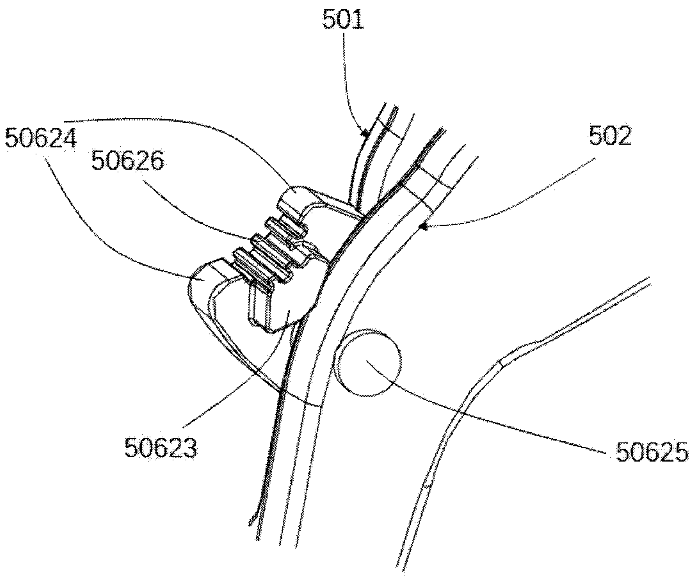
FIG. 42 is a schematic enlarged diagram of the second locking device after being mounted according to Embodiment 7 of the present application.
Figure 43:
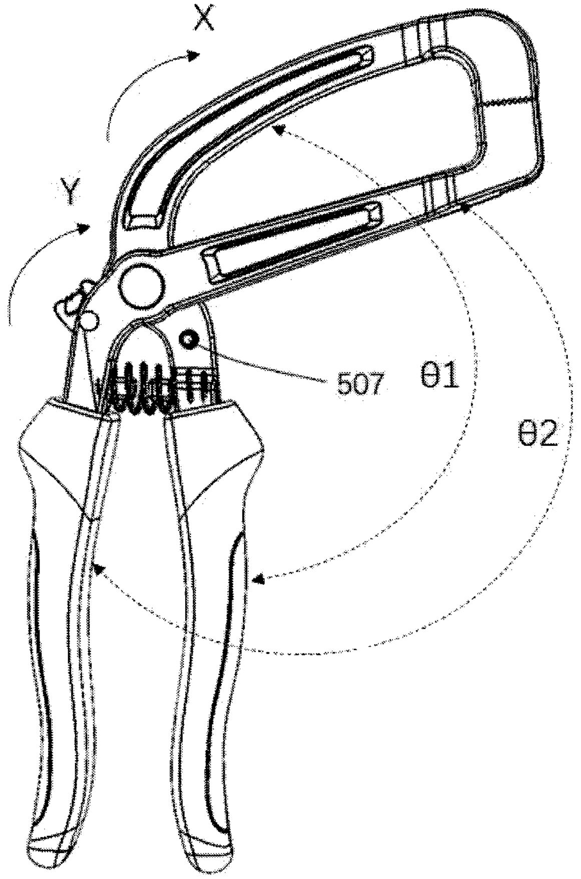
FIG. 43 is a rear view of the second pushing and clamping pliers according to Embodiment 7 of the present application.

As shown in FIG. 39, the second locking slot 5061 is disposed at the outer side wall of the third bent portion 5015, the second locking member 5062 is rotatably fitted to the fourth clamping portion 5021, preferably at the surface of the end of the fourth clamping portion 5021, and the second locking member 5062 is disposed opposite the second locking slot 5061. As shown in FIGS. 40, 41 and 42, the second locking member 5062 comprises a second locking member body 50621, a second locking engagement block 50622, a limiting block 50623, and a toggle portion 50624. The second locking member body 50621 is rotatably connected to the end of the fourth clamping portion 5021 via the fourth pivot 50625. The second locking engagement block 50622 has an obtuse angle and is located at the surface of the second locking member body 50621. The limiting block 50623 is formed by the surface of the second locking member body 50621 protruding outward, with the side wall thereof being bent, with one bent side wall abutting against the side wall of the end of the third clamping portion 5011. The toggle portion 50624 is used to move the second locking member body 50621 and is disposed at the surface of the second locking member body 50621, and the side wall of the toggle portion 50624 is inwardly recessed from the surface of the second locking member body 50621 so as to form convex corners at two ends of the side wall of the toggle portion 50624 to facilitate moving the second locking member 5062. A toothed pattern 50626 is provided in the side wall of the toggle portion 50624 so as to increase the friction when the second locking member 5062 is moved. The toggle portion 50624 can be moved with a finger to drive the second locking member body 50621 to rotate such that the second locking engagement block 50622 is engaged into or disengaged from the second locking slot 5061. The second locking device 506 further comprises a second blocking block 507, which is disposed at the surface of the third clamping portion 5011 and is disposed opposite the fourth bent portion 5025. When the second pushing and clamping pliers 500 has the maximum opening angle, the second blocking block 507 comes into contact with the fourth bent portion 5025 so as to block the fourth bent portion 5025.

When the second pushing and clamping pliers 500 need to be adjusted from the closed state to the opened state, the two handheld portions can be first closed, and then the toggle portion 50624 is rotated counterclockwise, such that the second locking engagement block 50622 is disengaged from the second locking slot 5061 and is therefore unlocked, and the two clamping portions are opened under the action of the second elastic member 505 (coil spring). When the second pushing and clamping pliers 500 need to be adjusted from the opened state to the closed state, the two handheld portions can be first closed, and then the toggle portion 50624 is rotated clockwise, such that the second locking engagement block 50622 is engaged into the second locking slot 5061, and the two clamping portions are therefore locked in the closed state.

It should be understood that the second locking slot 5061 may also be disposed at the outer side wall of the fourth bent portion 5025, and the second locking member 5062 is rotatably connected to the end of the third clamping portion 5011 and is disposed opposite the second locking slot 5061. The second blocking block 507 is disposed at the fourth clamping portion 5021, preferably at the surface of the end of the fourth clamping portion 5021, and is disposed opposite the third bent portion 5015.

Figure 45:
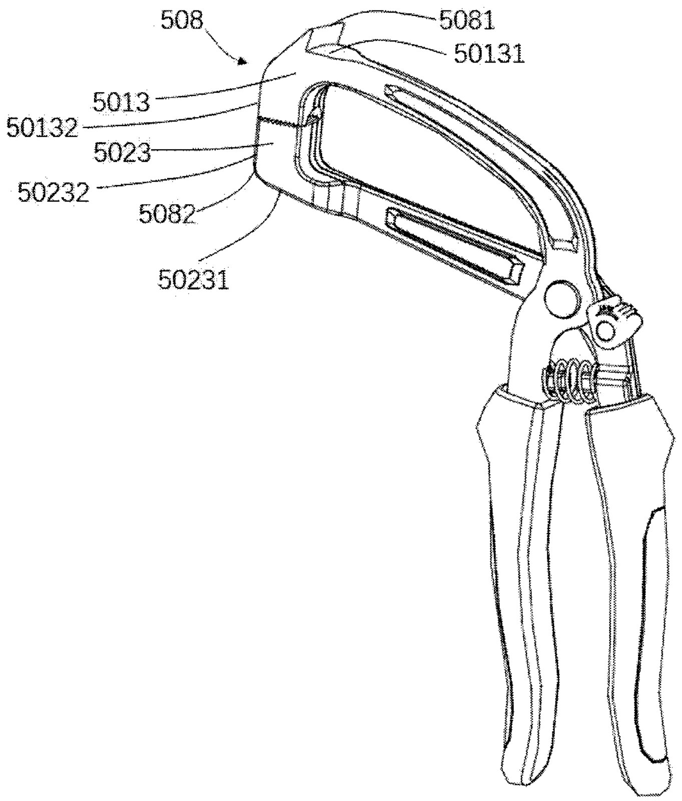
FIG. 45 is a schematic structural diagram of a second pulling device according to Embodiment 7 of the present application.

The pulling device 35 of the pushing and clamping pliers 3 in Embodiment 1 may also be applied to this embodiment. As shown in FIG. 45, the second pushing and clamping pliers 500 further comprises a second pulling device 508, which comprises a second hooked corner portion 5081 and a second rounded corner portion 5082. The second hooked corner portion 5081 is disposed on one of the third clamping block 5013 and the fourth clamping block 5023, and the second rounded corner portion 5082 is disposed on the other of the third clamping block 5013 and the fourth clamping block 5023. Here, description is made taking an example in which the second hooked corner portion 5081 is disposed at the third clamping block 5081, and the second rounded corner portion 5082 is disposed at the fourth clamping block 5023. The second hooked corner portion 5081 protrudes in a barbed shape from the outer side wall 50131 of the third clamping block 5013, and the outer edge of the second hooked corner portion 5081 is a smooth flat surface or an arc-shaped curved surface, and is disposed at the junction of the side wall 50131 and the top 50132 of the third clamping block 5013. The second rounded corner portion 5082 is disposed at the junction of the side wall 50231 and the top 50232 of the fourth clamping block 5023, and each of the two bifurcated portions has a second rounded corner portion 5082. It should be understood that the second hooked corner portion 5081 is in a barbed shape and can protrude from the outer side wall 50231 of the fourth clamping block 5023, and the two bifurcated portions protrude outwardly and extend to form a second hooked corner portion 5081, and the second hooked corner portion 5081 has an outer edge that is a smooth flat surface or an arc-shaped curved surface, and is disposed at the junction of the side wall 50231 and the top 50232 of the fourth clamping block 5023. The second rounded corner portion 5082 can be disposed at the junction of the side wall 50131 and the top 50132 of the third clamping block 5013.

Figure 46:
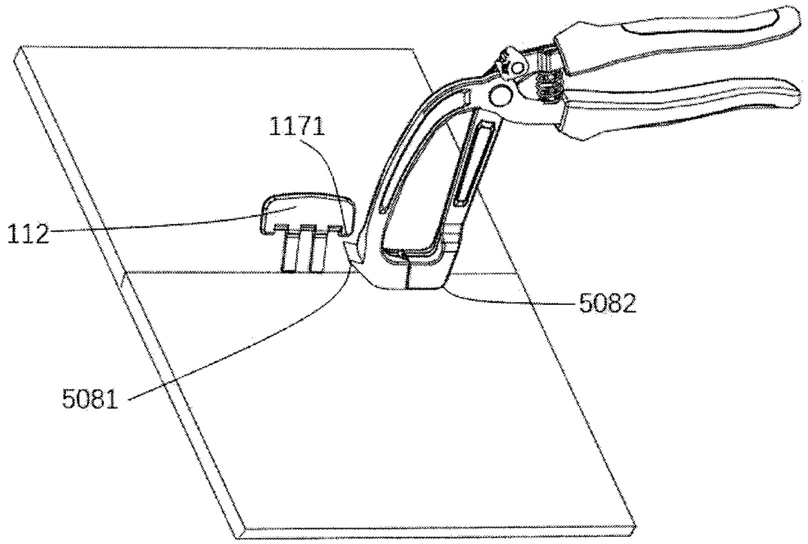
FIG. 46 is a schematic structural diagram of the second pulling device in a use state according to Embodiment 7 of the present application.

In the ceramic tile laying process, after the adhesive is cured, the ceramic tile leveling bracket and the ceramic tiles are all fixed by the adhesive, and the second pulling device 508 of the second pushing and clamping pliers 500 can be used to remove the upper half of the ceramic tile leveling bracket, wherein the ceramic tile leveling bracket may be the ceramic tile leveling bracket of any one of Embodiments 1-4. Here, the second ceramic tile leveling bracket 101 in Embodiment 2 is described as an example. As shown in FIG. 46, by means of the second hooked corner portion 5081 abutting against the lower edge of the limiting portion 117 of the second ceramic tile leveling bracket 101, and taking the second rounded corner portion 5082 as a fulcrum, the second insert 112 is broken from the second connecting portion 113 to remove the portion of the second insert 112 above the second connecting portion 113.

Embodiment 8

As shown in FIGS. 47-50, this embodiment discloses a third pushing and clamping pliers 600 for the ceramic tile leveling system, which is merely different from the second pushing and clamping pliers 500 in Embodiment 7 in that the locking devices are different. In this embodiment, the locking device 37 used by the pushing and clamping pliers 3 in Embodiment 1 is used instead of the second locking device 506 in Embodiment 7.

Figure 47:
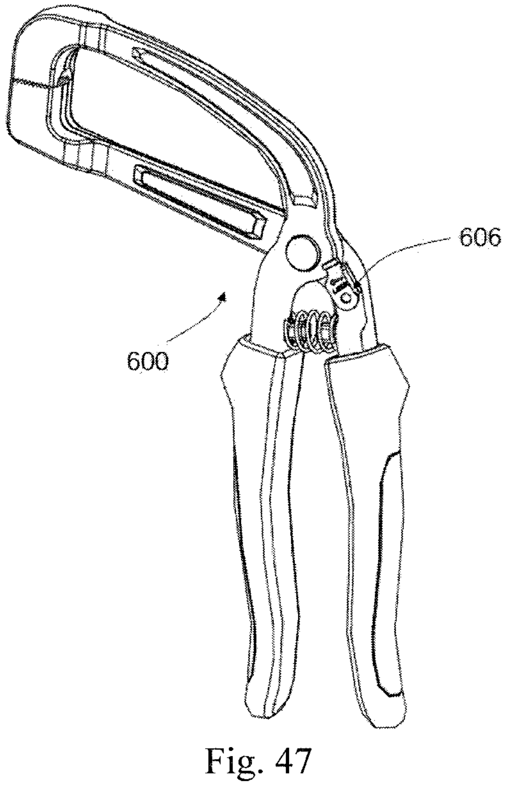
FIG. 47 is a schematic structural diagram of third pushing and clamping pliers according to Embodiment 8 of the present application.
Figure 50:
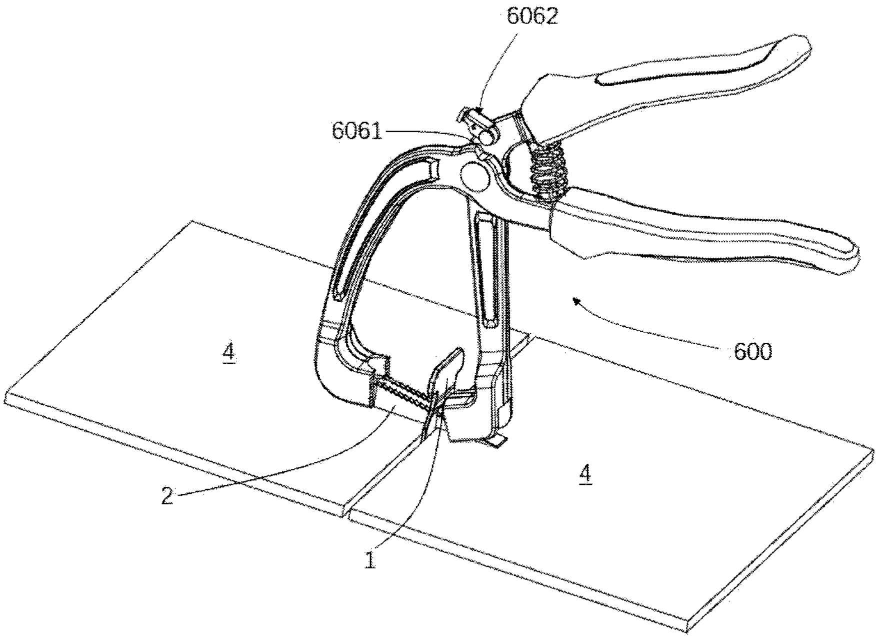
FIG. 50 is a schematic structural diagram of the third pushing and clamping pliers in a use state according to Embodiment 8 of the present application.

As shown in FIGS. 47 and 50, the third pushing and clamping pliers 600 comprise a third locking device 606. The third locking device 606 comprises a third locking slot 6061, a third locking member 6062, and a third blocking block 607. The third locking slot 6061 is disposed on one of the two clamping portions and is located at the outer side wall of the bent portion of the clamping portion. The third locking member 6062 is rotatably connected to the other of the two clamping portions and is disposed opposite the third locking slot 6061. The third blocking block 607 is disposed on the same clamping portion as the third locking slot 6061, and is disposed opposite the bent portion of the other clamping portion.

Figure 48:
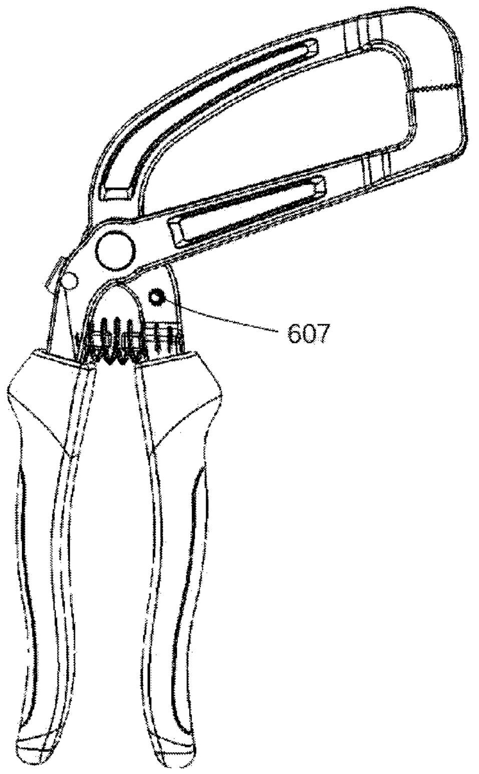
FIG. 48 is a rear view of the third pushing and clamping pliers according to Embodiment 8 of the present application.
Figure 49:
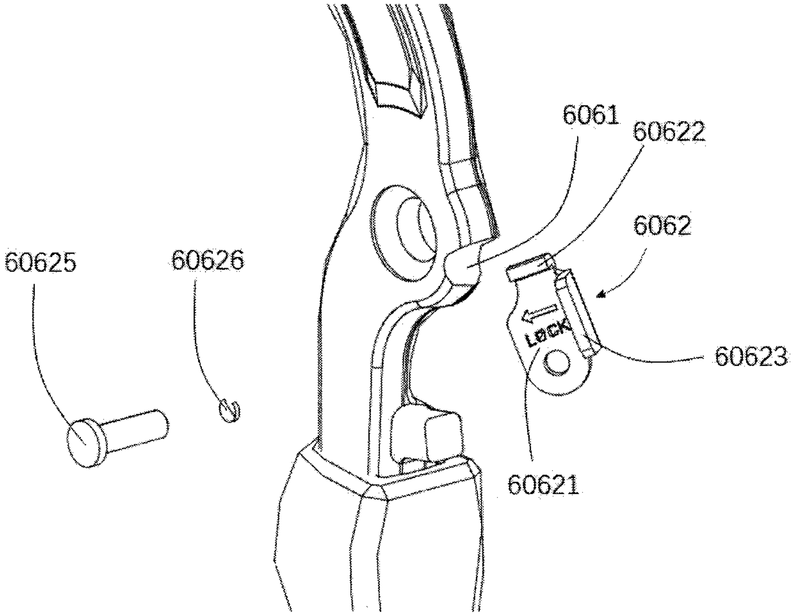
FIG. 49 is a schematic exploded diagram of a third locking device according to Embodiment 8 of the present application.

As shown in FIGS. 48 and 49, the third locking member 6062 comprises a third locking member body 60621, a third locking engagement block 60622, and a second tab 60623. The third locking member body 60621 may be a metal sheet, and is rotatably connected to the end of one of the two clamping portions via the fifth pivot 60625. A second gasket 60626 is provided between the third locking member 6062 and the clamping portion connected thereto, the third locking member 6062 and the clamping portion are both made of metal, and the second gasket 60626 can assist in the relative rotation of the two, thereby reducing wear between the components. The third locking engagement block 60622 protrudes from the surface of the third locking member body 60621 and is located at one end, facing the third locking slot 6061, of the third locking member body 60621. When the third locking engagement block 60622 is engaged into the third locking slot 6061, the third locking device 607 is locked. When the third locking engagement block 60622 is disengaged from the third locking slot 6061, the third locking device 607 is unlocked. The second tab 60623 protrudes form the surface of the third locking member body 60621 and is preferably perpendicular to the surface of the third locking member body 60621, and the user can move the second tab 60623 with a finger to drive the third locking member body 60621 to rotate, such that third locking engagement block 60622 is engaged into or disengaged from the third locking slot 6061.

The above description is only preferred embodiments of the present application, and a person of ordinary skill in the art can also make some improvements and refinements to the above technical solutions without departing from the principles of the present application, and these improvements and refinements should also be considered to be within the scope of protection of the present application.

What is claimed is:

1. Pushing and clamping pliers used to push an insertion block into a ceramic tile leveling bracket, the pushing and clamping pliers comprising:

a first component comprising a first clamping portion and a first handheld portion;

a second component comprising a second clamping portion and a second handheld portion;

a pivot via which the second clamping portion is rotatably connected to the first clamping portion;

a first clamping block disposed at a top end of the first clamping portion, away from the first handheld portion;

a second clamping block disposed at a top end of the second clamping portion, away from the second handheld portion;

a first groove inwardly recessed from an inner side wall of the first clamping block, with a direction of opening of the clamping groove facing the second clamping portion; and a second groove, which penetrates the second clamping block toward the first clamping block and is disposed opposite the first groove;

the first groove and the second groove being configured to hold the insertion block when the pushing and clamping pliers push the insertion block into the ceramic tile leveling bracket;

wherein the first clamping portion extends and bends from the first handheld portion, the second clamping portion extends and bends from the second handheld portion, and the first clamping portion and the second clamping portion bend in the same direction;

wherein the pushing and clamping pliers further comprises an elastic member one end of the elastic member connected to the first component and another end of the elastic member connected to the second component, the elastic member configured to exert an elastic force to cause the first component and the second component to move in an opening direction;

wherein the pushing and clamping pliers further comprise a locking device configured to overcome the elastic force of the clastic member when the locking device is locked, so that the first component and the second component are in a closed state;

wherein the pushing and clamping pliers further comprise a first bent portion, which is part of the first clamping portion and is sheathed outside the pivot; and a second bent portion, which is part of the second clamping portion and is sheathed outside the pivot;

the locking device comprises:

a locking slot disposed on the first clamping portion and located away from an outer side wall of the first bent portion of the first clamping portion;

a locking member rotatably connected to the second clamping portion and disposed opposite the locking slot; and a blocking block disposed on the first clamping portion and disposed opposite the second bent portion of the second clamping portion, the blocking block being configured such that when the pushing and clamping pliers have a maxi am opening angle, the blocking block comes into contact with the second bent portion of the second clamping portion.

2. The pushing and clamping pliers of claim 1, wherein the pushing and clamping pliers further comprises:

a first guiding post protruding from a side face, facing to the second component, of the first component;

a second guiding post protruding from the second component and disposed opposite the first guiding post;

wherein the elastic member is a spring with one end of the spring being sheathed over the first guiding post, and another end of the spring being sheathed over the second guiding post.

3. The pushing and clamping pliers of claim 1, wherein the locking member comprises:

a locking member body rotatably connected to the second clamping portion via a second pivot;

a locking engagement block protruding from a surface of the locking member body to cooperate with the locking slot; and a tab protruding from the surface of the locking member body to drive the locking member body to rotate.

4. The pushing and clamping pliers of claim 1, wherein the locking member comprises:

a locking member body rotatably connected to the second clamping portion via a second pivot;

a locking engagement block, which has an obtuse angle and is located at a surface of the locking member body to cooperate with the locking slot;

a limiting block formed by the surface of the locking member body protruding outward, with a side wall of the limiting block being bent; and a toggle portion used to move the locking member body; the toggle portion being disposed at the surface of the locking member body, a side wall of the toggle portion being inwardly recessed from the surface of the locking member body, and the side wall of the toggle portion being provided with a toothed pattern.

5. The pushing and clamping pliers of claim 1, further comprising:

a pulling device that comprises a hooked corner portion and a rounded corner portion, the hooked corner portion being in a barbed shape; wherein the hooked corner portion is disposed at one of the first clamping block and the second clamping block, and the rounded corner portion is disposed at the other of the first clamping block and the second clamping block.

6. The pushing and clamping pliers of claim 1, further comprising clamping teeth, wherein the clamping teeth are disposed on a side face of the first clamping block, facing the second clamping block, and/or the clamping teeth are disposed on a side face of the second clamping block, facing the first clamping block.

7. Pushing and clamping pliers used to push an insertion block into a ceramic tile leveling bracket, the pushing and clamping pliers comprising:

first component comprising a first clamping portion and a first handheld portion;

a second component comprising a second clamping portion and a second handheld portion;

a pivot via which the second clamping portion is rotatably connected to the first clamping portion;

a first clamping block disposed at a top end of the first clamping portion, away from the first handheld portion;

a second clamping block disposed at a top end of the second clamping portion, away from the second handheld portion;

a first groove inwardly recessed from an inner side wall of the first clamping block, with a direction of opening of the clamping groove facing the second clamping portion; and a second groove, which penetrates the second clamping block toward the first clamping block and is disposed opposite the first groove;

the first groove and the second groove being configured to hold the insertion block when the pushing and clamping pliers push the insertion block into the ceramic tile leveling bracket;

wherein the first clamping portion extends and bends from the first handheld portion, the second clamping portion extends and bends from the second handheld portion, and the first clamping portion and the second clamping portion bend in the same direction;

wherein the pushing and clamping pliers further comprise a pulling device that comprises a h booked corner portion and a rounded corner portion, the hooked corner portion being in a barbed shape; wherein the hooked corner portion is disposed at one of the first clamping block and the second clamping block, and the rounded corner portion is disposed at the other of the first clamping block and the second clamping block.

* * * * *